(12) United States Patent
Barenburg et al.

(10) Patent No.: US 7,207,481 B2
(45) Date of Patent: Apr. 24, 2007

(54) METHOD FOR IMPROVING SECURITY AND ENHANCING INFORMATION STORAGE CAPABILITY, THE SYSTEM AND APPARATUS FOR PRODUCING THE METHOD, AND PRODUCTS PRODUCED BY THE SYSTEM AND APPARATUS USING THE METHOD

(75) Inventors: Ronald Barenburg, New York, NY (US); Rhett C. Bordner, New York, NY (US)

(73) Assignee: Secure Symbology, Inc., New York, NY (US)

( * ) Notice: Subject to any disclaimer, the term of this patent is extended or adjusted under 35 U.S.C. 154(b) by 412 days.

(21) Appl. No.: 10/829,736

(22) Filed: Apr. 22, 2004

(65) Prior Publication Data

US 2005/0061878 A1 Mar. 24, 2005

Related U.S. Application Data

(60) Provisional application No. 60/505,127, filed on Sep. 23, 2003, provisional application No. 60/530,415, filed on Dec. 17, 2003.

(51) Int. Cl.
*G06F 7/08* (2006.01)
(52) U.S. Cl. ..................................... 235/381; 235/382
(58) Field of Classification Search ................ 235/381, 235/382, 385
See application file for complete search history.

(56) References Cited

U.S. PATENT DOCUMENTS

| | | | |
|---|---|---|---|
| 5,128,527 A * | 7/1992 | Kawai et al. .......... | 235/462.07 |
| 5,929,415 A | 7/1999 | Berson | |
| 6,038,200 A * | 3/2000 | Ozue et al. ............... | 369/30.29 |
| 6,158,660 A * | 12/2000 | Blanford et al. ........ | 235/462.11 |
| 2002/0121551 A1* | 9/2002 | De Renzis ............. | 235/462.12 |
| 2003/0141358 A1 | 7/2003 | Hudson et al. | |
| 2004/0182931 A1* | 9/2004 | Lapinski et al. ........ | 235/462.12 |

FOREIGN PATENT DOCUMENTS

WO    WO 03038738    5/2003

OTHER PUBLICATIONS

International Search report for Lubow WO 03/038738.
International Search report for parent application PCT/US04/012418, including written opinion (8 pages).

* cited by examiner

*Primary Examiner*—Thien M. Le
*Assistant Examiner*—Allyson N Trail
(74) *Attorney, Agent, or Firm*—Lackenbach Siegel LLP

(57) ABSTRACT

One alternative and optional method of the present invention provides a secured item specific identification system incorporating the steps of identifying an item to a determined degree, generating a first identifying code for the item, generating a second code and separately providing the same to a partner, enabling an access to secure identification data regarding the item upon an authorizing use of both the first and second code. In other optional alternative embodiments, the first and second codes may be optionally linked or alternatively provided in alternative and adaptive composite symbology formats.

28 Claims, 10 Drawing Sheets

METHOD FOR IMPROVING SECURITY AND ENHANCING INFORMATION STORAGE CAPABILITY, THE SYSTEM AND APPARATUS FOR PRODUCING THE METHOD, AND PRODUCTS PRODUCED BY THE SYSTEM AND APPARATUS USING THE METHOD

PRIORITY CLAIM

This application claims priority from U.S. Provisional Application No. 60/505,127 filed Sep. 23, 2003, U.S. Provisional Application No. 60/530,415 filed Dec. 17, 2003, and from PCT Application Ser. No. PCT/US04/12418, filed Apr. 22, 2004, the contents of which are each incorporated herein by reference.

SELECTED FIGURE

Applicants select FIG. 9 for publication.

BACKGROUND OF THE INVENTION

1. Field of the Invention

The present invention relates broadly to a method and apparatus for improving aspects of information security, information delivery, and information dissemination as well as information storage. In alternative embodiments, the present invention may also relate to a method, apparatus, or system for constructing, deconstructing, and reconstructing coded symbols or parts of coded symbols by means of encodation or decodation methods, optionally involving encryption, hashed-type, or other methods of encodation, and master communication systems supporting the same.

2. Description of the Related Art

Since their invention in the early 1950's, bar codes have accelerated the flow of products and information throughout the global business community. Coupled with the improvements in data accuracy that accompanies the adoption of bar code technology over keyboard data entry, bar code systems are now critical elements in conducting business in the global economy.

As discussed in U.S. Pat. No. 6,631,843, optically encoded indicia, such as bar codes are well known in the art but limitations exist. Today, bar codes are used in just about every type of business application: point-of-sale (POS), retail, warehousing, etc. Bar codes are printed on many types of alternative substrates, individual items, and on various containers enclosing a number of items. Bar codes carry information encoded into bars and spaces of various widths, arranged in predetermined patterns. The bars and spaces are made up of unit elements called modules.

A module has a specified height and width. Width is usually called the horizontal dimension of the module. When a laser scanner scans a bar code, bar code modules are usually crossed by the scanning beam typically along its horizontal dimension, but many bar codes may be scanned omni-directionally.

The relative size of a bar coded label is determined by the type of coding used, as are the actual sizes of the label's individual bars and spaces. The size of the bar code is also directly proportional to the amount of information that is stored in that bar code. Conversely, the amount of information is constrained by the size limitations on the bar code. In sum, bar codes are scanned via a bar code scanning system, and the encoded information gets extracted and decoded by the system's processing means.

Bar code reading can be accomplished by scanning across the bar code with a laser scanner, a wand, a charged coupled device (CCD), or some other solid-state imaging device (SSI). Bar code reading systems are known in the art and have been disclosed, for example, in U.S. Pat. Nos. 4,251,798; 4,360,798; 4,369,361; 4,387,297; 4,409,470 and 4,460,120.

The newest symbologies include options to encode multiple languages within the same symbol, and can even allow (through deliberate redundancies) reconstruction of data if the symbol is damaged.

At the last count, there were over one hundred (100) defined and known bar code symbologies. Unfortunately, only a handful of these symbologies are in current use, and fewer still are widely known and used internationally.

A number of different one-dimensional bar code symbologies (alternatively called or referred to as 1D-encodation schemes or 1D symbologies) exist. These symbologies include, but are not necessarily limited to: UPC-A, UPC-E, EAN-8, EAN-13 and UCC/EAN-128 and/or other common-type and known 1D bar codes as defined by the representative governing councils, and standards defining organizations. This may also include applicable Application Identifiers, UCC Coupon Value Codes and HIBC UCC/EAN-128 Secondary Input Data formats encoded in UCC/EAN-128, among others known in the 1D bar code symbology field.

It should be noted that the Uniform Code Council, Inc. (UCC) and EAN International are voluntary standards organizations that together manage the EAN/UCC system. The Automatic Identification Manufacturers Association (AIM) and AIDC are also standards defining organizations that set global standards for multiple facets of technology. Unfortunately, traditional 1D bar codes, due to their low information density storage capacity, can carry only a limited amount of information, on the order of ten to twenty letters or digits assigned under relative standards to general-level type information. This general-level type information is usually an index to a particular file or a general database where general-level information (country code, manufacture's name, type of product, UCC identification, etc.) is stored regarding a manufacturer or type of product.

Since the inception of retail bar code scanning, the identification of products using machine-readable bar codes has enhanced the efficiency of the supply chain, and the networking of voluntary opt-in supply-chain partners, in all business sectors.

By using bar codes as a "pointer" to an accessible database field, machine-readable bar codes have the ability to quickly and accurately identify product and other previously-entered coded information, for example sales coupons relating to a particularly item.

Unfortunately, bar codes as "dumb" vehicles for information have the limitation of being held to a space requirement that puts a ceiling on the amount of information that can be contained in the bar code.

It should be understood, that a conventional bar code symbol is a 'one-dimensional' symbol, in that the bars and the spaces extend only in a single direction and 'two-dimensional' bar codes have been proposed with various concerns noted below.

With the advent of two-dimensional (2-D) encodation schemes (alternatively called 2D symbologies or 2D encodation schemes) for bar codes such as: DataMatrix, PDF-417, Reduced Space Symbology (RSS) and Composite Symbology (CS), the amount of information that may be placed into the physical bar code (within a smaller footprint) increased.

Unfortunately 2-D bar code use (and 2D symbology use) in the retail sector is limited by the requirements dictated by the Uniform Code Council (UCC) standard symbology for retail, UPC-A bar codes. The UPC-A standard had a 12 digit, numeric only identifier that breaks down the classification of a product to for items, namely: (1) country code, (2) manufacturer identifier, (3) manufacturer's product identifier and (4) a check digit. Thus, when scanned, a UPC-A bar code points to a line item in a database corresponding to that product and the line item includes only these four (4) items of product information. Where a UPC-A code was extended indefinitely in size (for example 20 centimeters (cm)) additional data may be stored, this adaptation has note been adopted due to the impermissible size concerns and inability to manage a code data base in such a manner.

Some 1-dimensional (1-D or 1D) bar codes are referred to as belonging to the (n, k) family. A code of (n, k) type uniquely represents characters by a string of n modules containing "n" bars and "k" spaces. The UPC symbology is an example of a (7,2) code, i.e., n=7 and k=2. This type of 1-D symbology bar code or EAN/USC symbology is ideal for identifying products sold at a point of sale (POS). As will be noted, this code is designed to be especially tolerant of differing printing methods and allows the bar code to be scanned omni-directionally, speeding up the scanning process, but with the price of severely limiting the amount of data.

Since many retailers have not purchased 2-D or 2D bar code scanners, the use of 2-D bar codes in the retail sector provides an additional limitation and risks confusion. As a consequence, 2-D readers and codes are commonly relegated to use in the manufacture of small items that required a machine readable bar code (like electronics), that before 2D bar codes could not be marked with the standard 1-D bar codes like UCC/EAN Code 128, Code 39, or Interleaved 2 of 5 Codes. The Interleaved 2 of 5 Codes include (1) a quite zone, (2) a start character, (3) the encoding data, (4) a stop character, and (5) a trailing quiet zone, in addition to the information noted above.

As will be generally described, two-dimensional (2-D) bar codes carry more information per substrate area than linear one-dimensional (1-D) bar codes.

Some two-dimensional (2-D) bar code symbologies are just an extension of one-dimensional bar codes, in that they are formed by stacking rows of one-dimensional bar codes and typically placing a horizontal line between each row. In order to keep the same vertical dimension of the overall bar code, the height of each row is made smaller than the normal height of a one-dimensional bar code. An example of this type of code is discussed generally in U.S. Pat. No. 4,794, 239.

2-D symbols or codes are called two-dimensional because the data in the code is contained in both the horizontal direction (like 1-D/linear codes) and additionally in the vertical direction.

A number of different two-dimensional 2D symbologies exist. Some of the symbologies are: Aztec Code, Code 16K, Code 49, Data Matrix and Maxi-Code, etc.

PDF-417 symbology is one type of 'stacked' two-dimensional bar code symbology used when needed to encode a greater amount of information within a limited amount of space, thus giving generating an even higher information density encodation scheme. An example of this type of symbology is discussed in U.S. Pat. No. 5,304,786.

When a bar code is scanned by a laser scanner or a Charge Coupled Device (CCD) scanner, the scanner's bar code processing means must be able to determine the relative position of each scanned codeword (the "codeword" being the numeric value of a 1D or optionally a 2D bar code). Unfortunately, not only must the scanner be able to properly decode and parse the information contained in the particular codeword, the scanner must also determine where the codeword fits in relation to other code words within its row and with respect to other rows of code words.

Being able to implicitly encode the size or version of the bar code label while eliminating the explicit version information code words will increase the label data storage efficiency.

One type of 2D symbology, "Matrix Type codes" (MaxiCode, Data Matrix etc.) codes provide this type of high information density storage capacity in a reasonable size, but are also susceptible to inter-row cross-talk problems during use. As an additional problem, Matrix codes are not decodable by a laser scanner (must therefore be read by a more sophisticated and costly optical scanner) and therefore may not be used in many laser-scanning applications. In sum, the use of 2D symbology is growing very slowly due to large infrastructure costs, the cross-talk problem noted above, and other concerns commonly known.

There remains, however, an increasing need for machine-readable symbols that contain more information than conventional bar code symbols. These types of symbols are generally referred to as Reduced Space Symbology (RSS) and Composite Symbology (CS) symbols and should be understood as also being either types of 1D or 2D symbologies depending upon their actual design (as will be discussed below), and may be included in references hereafter to 1D or 2D symbologies as will be noted.

In detail, the first of these new symbologies, Reduced Space Symbologies (RSS), consists of a "high density" 1-D or Linear bar code, designed to encode standard UCC/EAN Item Numbers-up to 14 digits in a reduced-size footprint, resulting in a higher "data capacity" than existing UCC/ EAN bar codes. Several variants of RSS exist, including Limited RSS, Stacked RSS and Expanded RSS. Expanded RSS includes the ability to encode limited amounts of additional data beyond the basic UCC/EAN Item Number.

There are four different versions of the RSS family, each with slightly different features. Each version is designed to contain the UCC/EAN's designated Global Trading Identification Number (GTIN).

RSS-14 encodes the full 14 digit UCC/EAN Item Number in a linear symbol that can be scanned rasteringly or omni-directionally by suitably programmed scanners. See FIG. 1

RSS-14 LIMITED is a 1D linear symbol that encodes a 14 digit UCC/EAN Item Number with a Packaging Indicator/ Logistical Variant of zero or one as a prefix to the following number. It is designed for use on small items where label space is horizontally restricted, and will not be scanned at point of sale (POS). See FIG. 2.

RSS-14 STACKED is a variation of the RSS-14 symbology that is vertically truncated and stacked in two rows, and is used where label space is vertically restricted, and particularly on items that are not intended to be scanned at point of sale. See FIG. 3.

RSS EXPANDED encodes a UCC/EAN Item Number plus supplementary element strings such as weight and "best use before" date in a linear symbol that can be scanned omni-directionally by suitably programmed point-of-sale (POS) scanners. RSS Expanded can also be printed in multiple rows as a stacked symbol when the normal symbol would be too wide for the narrow applications. RSS Expanded has a maximum data capacity of 41 alphanumeric or 74 numeric characters. See FIG. 4.

Any member of the RSS family can be printed as a stand-alone linear symbol or as the Linear (1-D) Component of a Composite (2-D) Symbol.

The second new symbology, Composite Symbology (CS), consists of a 1-D symbol (RSS, UPC/EAN or UCC/EAN-128) paired with, and optionally in some cases 'electronically' and logically 'linked' to a 2-D symbol printed 'in the immediate area' of the 1D symbol. The 2-D symbol is either a PDF-417 symbol, or a UCC/EAN specific variant of Micro-PDF-417. Micro-PDF-417 is the version of PDF-417 designed for small item marking applications (small size), for example in semiconductor and electronic component manufacture. Collectively reference to a Composite Symbology hereafter may refer to a linked or non-linked/unlinked Composite Symbology depending upon the reference as noted herein.

In a conventional Composite Symbol (CS), the 1-D bar code is always immediately present and contains primary product identification information. Several types of Composite Symbols (CS) have been organizationally defined. The data capacity of the Composite (2-D) Component ranges from 56 digits to a maximum of 2361 digits.

As noted, present Composite Symbology (CS) technology combines a 1-D bar code with a high-capacity 2-D symbol based on PDF-417 or Micro-PDF in a single code printed together. In CS, the 2-D symbol is referred to as the Composite Component (CC) whilst the 1-D symbol is known as the Linear Component (LC).

There are three variants of the Composite Component (CC) each with a different data capacity: (A) CC-A has a data capacity of up to 56 digits and uses a UCC/EAN defined variant of Micro-PDF. (B) CC-B has a data capacity of up to 338 digits and uses standard Micro-PDF with a UCC/EAN reserved codeword. (C) CC-C has a data capacity of up to 2361 digits and uses a standard PDF-417 with a UCC/EAN reserved codeword.

A key concept within the Composite Symbology (CS) is 'linking.' The Composite Component (CC) of a Composite Symbol (CS) is printed in immediate conjunction with or in immediate reference with a 1-D bar code symbol, (the Linear Component (LC)).

In 'linking,' the 1-D (LC) symbol always contains the primary product identification. The conventional Composite Component (CC), always contains a special codeword indicating that the data is in accordance with UCC/EAN standards; e.g., (a) that a 1-D symbol is also present (required to read), and (b) that the 2-D bar code is "linked" to the 1-D symbol.

In conventional CS, "where possible" (e.g., optionally), the 1-D bar code also contains a "link," indicating that a Composite Component (CC) is present and that the 1-D bar code is linked thereto. Here, "where possible" reflects the fact that while some 1-D/LC symbologies, such as RSS, can support such a link, other 1-D/LC symbologies such as UPC/EAN and UCC/EAN-128, cannot. Depending on the application, the 1D bar code used within the Composite Symbol (CS) can be RSS, UPC/EAN or UCC/EAN-128.

Unfortunately, some restrictions exist using the CS format. For example, RSS can be used only with CC-A and CC-B symbologies. As further explanation, the following examples and symbols are included.

Example 1, Composite Symbology (CS) with RSS-14 limited symbology. See FIG. 5.

Example 2, Composite Symbol (CS) with RSS-14 stacked symbology. See FIG. 6.

Example 3, Composite Symbol (CS) with UCC/EAN-128 type symbology. See FIG. 7.

Example 4, Composite Symbol (CS) with UPC-A type symbology. See FIG. 8.

Additionally, Composite Symbology (CS) concepts are also applicable to other symbologies, including RSS, RSS-14 Truncated, RSS-14 Expanded, RSS-14 Stacked Omni-directional, UPC-E, EAN-13, EAN-8, with the corresponding Composite variants: CC-A/B, CC-A/B (14), CC-C and CC-C (14).

In sum, conventional Composite Symbology (CS), which incorporates a 1-D linear component with a 2-D Composite Component, is a new class of symbology designed to address applications that are not being met by current technology solution sets. Composite Symbology (CS) should be understood as a combination of two encodation schemes, generally a 1D and 2D scheme.

Unfortunately, where new 1-D, 2-D, or CS technology is created, infringers, copyists, counterfeiters, and other criminals rapidly attempt to duplicate or copy a particular bar code to gain legitimacy and move their goods into or through a legitimate means and into the opt-in manufacturer-supplier-customer network.

For example, a bar code for a particular type of medicine is generated by a manufacturer (ex. Aspirin). The bar code links to a data base and includes information regarding generally a manufacture, type of product, description of the product and other "higher-order information" (not specific-item information, as will be described). This same bar code is used on one-hundred (100) bottles of Aspirin placed in a single box with five-hundred (500) other bottles and placed on a pallet with five-hundred (500) other boxes and sent to a shipping agent. The shipping agent looses the one box and reports the loss to the manufacturer.

In this example, the box of Aspirin was stolen by one who copies a previously legitimate bar code from the separate legitimate box, re-labels the stolen goods, and ships the now re-labeled goods to a pharmacy. Here, because the linked data base system can only track a product by "higher-order information" and cannot track a product by a designated specific-item information e.g., individual item/bottle/dose/pill (and because the counterfeit bar code is therefore legitimate), the pharmacy when scanning the counterfeit/stolen goods cannot detect the error, the manufacture cannot detect the error, and the pharmacy sells the stolen/counterfeit goods to the public.

It is estimated that approximately 30 billion dollars, or about 10% of the entire world pharmaceutical drug market is "lost" annually (via theft, physical loss, counterfeiting, improper returns, legitimate returns, or damage). According to the FDA and other government agencies, there is an immediate need for a solution to prevent counterfeit drug labels and products because the largest markets for counterfeit drugs include the US and European Union countries.

The FDA generally and very broadly suggests, via its anti-counterfeit drug task force, that manufactures adopt an anti-counterfeiting solution having the ability to (1) incorporate all drug products with at least two types of validated anti-counterfeiting technology, into labeling at the point of manufacture (with at least one of these technologies being "covert" or requiring special equipment or knowledge for detection and the other being "overt", or obvious that an anti-counterfeiting method is being used); (2) create some type of broad electronic data base for a drug and biologics tracking purposes, (3) achieve the goal of pedigree requirements by phasing in a system for an electronic pedigree for all drugs and biologics; and (4) that the authentication trail result in a drug pedigree, capable of specific origin, point of manufacture, contents information, date, lot number to an individual item number.

Various anti-counterfeiting steps and other measures have been taken in an attempt to meet these very broad and indefinite FDA suggestions. Unfortunately, each step requires an additional change in the manufacturing or review process or has various negative drawbacks related to cost.

In one step taken to meet the FDA suggestions, Electronic Product Codes (EPC™) have been recently created. EPC™ is a new type of designated alpha-numeric code that operates like the old bar code symbologies, in that when used as a coded identifier and scanned, links to a line in a database, in many cases an internet-maintained database. The EPC™ identifier consists of a string of characters containing information about a specific product or higher order information, i.e.: manufacturer, object classification, and other identifiers specific to an industry and in some rare cases, and a unique serial number for each designated item.

The motivation for the new EPC™ system is to provide a single code uniquely identifying a product, whether by unit, or at any desired packaging level, from its manufacture through the supply chain to delivery, by a system of readers and online databases that are updated regularly as that item(s) moves through the supply chain.

The EPC™ system is linked with, and transmitted by, the RFID tag technology system, either in 64 or 96 bit configurations. As a consequence, the EPC™ system unfortunately necessitates all of the software, hardware, and RFID configurations included in an integrated superstructure, as well as being dependent on the unproven online database for tracking and reporting.

As noted, one other anti-counterfeiting proposal includes the use of RFID technology.

Radio Frequency Identification (RFID) has been touted as the successor to the bar code because of its ability to store much information in a small button or wired label, and have that information read by out-of-line-of-sight readers, in either singularly or in multiple configurations employing RF signal receivers. Read/Write RFID tags may also allow the 'tagged' information to be electronically updated. Several drawbacks to the RFID system include the expensive, and the interconnected and integrated infrastructure necessary to support the utilization of RFID as a vehicle for the transportation of information.

One benefit of an RFID-enable good, is that the good may be returned without receipt because the stores' data base will store who made the purchase, allowing a customer with photo ID to return the item without the receipt.

Alternative RFID benefits have been formulated, for example, refrigerators may be programmed to automatically tally goods and order deliveries of replacements without human intervention. Additional benefits are proposed for those who are hearing or sight impaired allowing audible tracking of a necessary drug or the audible announcement of where the item is. To this end, a major retailer, Wal-Mart, has requested that all goods supplied to be "RFID compliant" by January 2005. Unfortunately, many suppliers, and indeed Wal-Mart itself, may not meet this requirement.

As noted earlier, the planned EPC™ process necessitates all of the software, hardware and RFID configurations included in an integrated infrastructure, as well as being dependent upon an unproven online RFID linked database for tracking and reporting.

Additionally, since RFID technology employs tiny RF (Radio Frequency) signals collected by receivers, the location, type, and positioning of the receivers is critical. Many shippers, transporters, manufacturers, and retailers employ unshielded electrical and data lines throughout their facilities. Electrical lines (particularly high voltage lines) and data lines (particularly co-axial lines), produce an electromagnetic spectrum that interferes with the tiny RF signals, preventing RFID tag use or causing false RFID readings. Consequently, before efficient and secure RFID use is achieved, substantial infrastructure costs and reinvestment may be necessary.

While the future utility of RFID tracking is well known, individual privacy concerns have also grown in parallel with the growth of information tracking. Privacy concerns exist for RFD technology because RFID devices may be woven into fabrics, embedded in all types of goods, and otherwise hidden by manufacturers in a manner not easily detected. RFID transmitters cannot be turned off. As a consequence, consumer advocates have noted that government agents or criminals employing existing technology RFID scanners may in the future approach a home or office and identify, via RFID signals, the contents, who purchased the contents, whether or not any of the contents were reported stolen or recalled, whether anyone wearing an RFID item is moving within the home or office, and in other ways conduct a warrant-less search. These concerns have caused privacy advocates to raise objections with the RFID technology.

In sum, while many infrastructure and practical concerns remain for the wide spread use of RFID technology, what is needed is a technology that bridges the gaps between known bar-code technology and the future RFID systems at the present time.

In sum, there are substantial concerns regarding the standards, technology, and privacy for RFID implementation, and it is clear that many years will pass before use of RFID wide spread.

What is needed is the capacity for easy tracking of individual goods or items now employing previously unknown item-specific information without changing the present physical infrastructure substantially, using known existing printing techniques, and easing the privacy concerns raised by the EPC™/RFID process, while enabling secure information systems to track user-identified items through changes in makeup or amount while retaining original information.

OBJECTS AND SUMMARY OF THE INVENTION

One object of at least one embodiment of the present invention is to provide a method or apparatus useful in improving tracking and identification of various items.

Another object of one alternative embodiment of the present invention is to provide a convenient method for real-time secure serialization, identification, and tracking of an item.

It is another object of at least one embodiment of the present invention to provide a bar code based tracking system enabling simple item verification and identification with a high security feature.

Another object of one alternative embodiment of the present invention is to provide an optional method of constructing, deconstructing and reconstructing a bar code, where alternative proposed embodiments may optionally include bar codes of various types and configurations to include or un-include any of the Symbologies as defined by the aforementioned councils and organizations.

Another object of one alternative embodiment of the present invention is to create a bar code encodation scheme (method) which minimizes or reduces the bar code start and stop characters, minimizes the bar code size carrying code words, implicitly encodes the bar code version, and reduces inter-row signal cross-talk. It is hoped that this embodiment and others will generate new bar code applications where traditional two-dimensional bar codes could not be used due to their limiting requirements.

The present invention relates, in at least one alternative method or apparatus, a secured item specific identification system incorporating the steps of identifying an item to a determined degree and recording the identification data in a secure database, generating and providing a first composite identifying code labeling the item, generating a second code electronically linked with the first code and separately providing the same to an authorized and identifiable partner, reconstructing the first and second codes upon a receipt of the item into a authorized format, and a step of reading the authorized format and accessing the database to note the authenticity of the item. In other alternative embodiments, the first and second codes are optionally linked or provided in alternative and adaptive formats. In yet further optional and alternative embodiments, additional security features structure accessing the database and additional type of codes are incorporated.

According to one alternative embodiment of the present invention there is provided a secure Application Software Platform, a bar code engine, enabled to send to authorized users electronic files of any 1D or 2D globally recognized bar code combinations or encrypted representations of same separately or together to a suitably configured commercial, on-line or stand alone printer.

According to an other alternative embodiment the present invention provides a secured item specific identification system incorporating the steps of identifying an item to a determined degree, generating a first identifying code labeling the item, generating a second code electronically joined with the first code and separately providing the same to an partner, enabling an access to secure identification data regarding said item upon the use of both the first identifying code and the second code. In other alternative embodiments, the first and second codes are optionally linked or provided in alternative and adaptive composite symbology formats.

According to one alternative embodiment of the present invention, there is provided a method for enhancing information security during item transfer, comprising the steps of: enumerating an item specific designation for a user specified item, encoding the enumerated item specific designation into a readable composite symbology encodation, the composite symbology encodation, comprising: at least a first and a second encoded symbology portion, wherein the at least first and second portions are electronically joined during the step of encoding and require a combination of the portions to read the encoded item specific designation, deconstructing the readable composite symbology encodation into the at least first and second encoded symbology portions rendering at least one of the at least first and second portions separately unreadable, applying one of the deconstructed at least first and second encoded symbology portions to the user specified item, transferring the user specified item to at least a first authorized party, transferring the other of the at least first and second encoded symbology portions to the at least first authorized party separately from the user specified item, and reconstructing the at least first and second encoded symbology portions and into the readable composite symbology encodation, thereby enabling the authorized party to conduct a step of reading the composite symbology encodation and determining the item specific designation.

According to another alternative embodiment of the present invention, there is provided a method for enhancing information security during item transfer, further comprising the steps of: recording the item-specific designation for the user specified item in an authorized-use accessible storage system after the step of enumerating an item specific designation, providing to the at least first authorized party means for securely accessing the authorized-use storage system upon the step of reconstructing the composite symbology encodation, and accessing the authorized-use accessible storage system and comparing the readable composite symbology encodation with the recorded item-specific designation, thereby enabling the authorized party to confirm at least one of a pedigree and an authentication of the user specified item.

According to another alternative embodiment of the present invention, there is provided a method for enhancing information security during item transfer, wherein: the means for securely accessing includes means for securely updating the authorized-use storage system, whereby the system enables at least a receipt confirmation of the user specified item.

According to another alternative embodiment of the present invention, there is provided a method for enhancing information security during item transfer, further comprising the steps of: conducting at least one step of an updating, a modifying, and a correction of the authorized-use accessible storage system to link the recorded item specific designation to at least one of a location status, a return status, an authorization status, a pedigree status, and a counterfeit status, relative to the user specified item, whereby the method enables a comprehensive supply-chain report during the item transfer to the authorized party.

According to another alternative embodiment of the present invention, there is provided a method for enhancing information security during item transfer, further comprising the steps of: accessing the authorized-use accessible storage system and determining at least a location of the user specified item. According to another alternative embodiment of the present invention, there is provided a method for enhancing information security during item transfer, wherein: the item specific designation includes both higher-order information and specific-item information effective to provide a user-determined unit designation to the user specified item.

According to another alternative embodiment of the present invention, there is provided a method for enhancing information security during item transfer, wherein: the higher-order information includes at least one of an NDC code or other universally recognized numbering system, manufacturer identification, and a transmission means, and the specific-item information includes at least a one of a serial number and a custom identification number for the user specified item.

According to another alternative embodiment of the present invention, there is provided a method for enhancing information security during item transfer, further comprising the steps of: enabling the authorized party to access the authorized-use accessible storage system via an internet-based secure hyperlink connection.

According to another alternative embodiment of the present invention, there is provided a method for enhancing information security during item transfer, wherein: at least one of the first and second encoded symbology portions is a 2D symbology encodation, and the other of the first and second encoded symbology portions is a 1D symbology encodation, whereby the readable composite symbology encodation combines the 1D and the 2D symbology encodations enabling an increased security during item transfer.

According to another alternative embodiment of the present invention, there is provided a method for enhancing information security during item transfer, wherein: at least one of the first and second encoded symbology portions is a 2D symbology encodation, and the other of the first and second encoded symbology portions is a 2D symbology encodation, whereby the readable composite symbology encodation combines the 2D first and second encoded symbologies enabling an increased security during item transfer.

According to another alternative embodiment of the present invention, there is provided a method for enhancing information security during item transfer, wherein: the step of encoding the readable composite symbology encodation further comprises a step of: providing additional human readable references to the item specific designation on the at least first and second encoded symbology portions.

According to another alternative embodiment of the present invention, there is provided a method for enhancing information security during item transfer, wherein: during the step of deconstructing portions of the human readable references are also deconstructed, thereby allowing during the step of reconstructing the authorized party to enter the human readable references in the authorized use accessible storage system to reconstruct the item specific designation and enable the authorized party to confirm the item specific designation despite a damage to the encoded symbology portions rendering them incapable of reading by non-human devices during the steps of reconstructing and accessing.

According to another alternative embodiment of the present invention, there is provided a method for enhancing information security during item transfer, wherein: the step of reconstructing includes at least one of a step of physically reconstructing and at step of electronically reconstructing the first and second symbology encoded portions into the readable composite symbology encodation, whereby the method enables an adaptive reconstructing method improving information security during item transfer.

According to another embodiment of the present invention, there is provided a method for enhancing information security during item transfer, comprising the steps of: enumerating an item specific designation for a user specified item, encoding the enumerated item specific designation into a readable composite symbology encodation, the composite symbology encodation, comprising: at least a first 2D encoded symbology portion and a second 1D encoded symbology portion, wherein the at least first and second portions are electronically joined during the step of encoding and require a combination of the portions to read the encoded item specific designation, deconstructing the readable composite symbology encodation into the at least first and second encoded symbology portions rendering at least one of the at least first and second portions separately unreadable, applying one of the deconstructed at least first and second encoded symbology portions to the user specified item, transferring the user specified item to at least a first authorized party, transferring the other of the at least first and second encoded symbology portions to the at least first authorized party separately from the user specified item, and reconstructing the at least first and second encoded symbology portions and into the readable composite symbology encodation, thereby enabling the authorized party to conduct a step of reading the composite symbology encodation and determining the item specific designation.

According to another embodiment of the present invention, there is provided a method for enhancing information security during item transfer, wherein: the first 2D encoded symbology portion is an RSS Limited Composite symbology, and the second 1D encoded symbology portion is a RSS Limited Linear symbology.

According to another embodiment of the present invention, there is provided a software platform for managing the methods described above either within a facility, between supply chain partners, or business users linked via the world wide web or internet or intranet via a wire or wireless communication system.

According to another alternative embodiment of the present invention, there is provided an apparatus for enhancing information security during an item transfer comprising: means for enumerating an item specific designation for a user specified item, means for encoding the enumerated item specific designation into a readable composite symbology encodation, the composite symbology encodation, comprising: at least a first and a second encoded symbology portion, wherein the at least first and second portions are electronically joined by the means for encoding thereby requiring at least one of a physical and an electronic combination of the portions to read the encoded item specific designation, means for deconstructing the readable composite symbology encodation into the at least first and second encoded symbology portions rendering at least one of the at least first and second portions separately unreadable, means for applying one of the deconstructed at least first and second encoded symbology portions to the user specified item, means for transferring the user specified item to at least a first authorized party, means for transferring the other of the at least first and second encoded symbology portions to the at least first authorized party separately from the user specified item, and means for reconstructing the at least first and second encoded symbology portions and into the readable composite symbology encodation, thereby enabling the authorized party to read the composite symbology encodation and determining the item specific designation.

According to another embodiment of the present invention, there is provided an apparatus for enabling an improved security and information transfer between a label generator generating a label for an item and an authorized party receiving the item, comprising: means for enumerating an item specific designation for the item, means for generating at least a machine readable composite symbology encodation for the item specific designation and for deconstructing the composite symbology encodation into at least a first encoded portion and a second encoded portion rendering the first and second encoded portions separately unreadable, the first encoded portion being a 2D symbology encodation portion, the second encoded portion being a 1D symbology encodation portion, means for printing at least the first encoded portion on a label for the item and applying the label to the item means for separately transferring the item labeled with the first encoded portion and the second encoded portion to the authorized receiving party, and means for reconstructing the first encoded portion from the label and the separately transferred second encoded portion thereby enabling a reading of the composite symbology and determination by the authorized receiving party of the item specific designation.

According to another embodiment of the present invention, there is provided an apparatus for enabling an improved security and information transfer between a label generator generating a label for an item and an authorized party receiving the item, wherein: the means for reconstructing enables at least one of a physical reconstruction and an electronic reconstruction of the composite symbology encodation, whereby the apparatus enables ready adaptation of the apparatus to differing authorized party practices.

According to another embodiment of the present invention, there is provided an apparatus for enabling an improved security and information transfer between a label generator generating a label for an item and an authorized party receiving the item, further comprising: means for providing a secure master data system to the label generator and the authorized party, means for recording the machine readable composite symbology encodation in the master data system linked with the designated specific-item information identifier from the label generator, and means for enabling the authorized party to securely access the secure master data system upon at least the reconstruction of the of the first and second encoded portions, thereby enabling an authentication by the authorized party that the item labeled with the first encoded portion is the item initially labeled by the label generator.

According to another embodiment of the present invention, there is provided an apparatus for enabling an improved security and information transfer between a label generator generating a label for an item and an authorized party receiving the item, wherein: the composite symbology encodation further comprises: human readable references respectively partitioned to the first and second encoded portions by the means for deconstructing, the secure master data system further comprises: at least one of a means for machine entering the machine readable composite symbology and means for human entering the human readable references, whereby the item label enables specific designated individualized product or item identification with a safety feature enabling at least one of a human access and a machine access to the specific-item information identifier.

According to another embodiment of the present invention, there is provided an apparatus for enabling an improved security and information transfer between a label generator generating a label for an item and an authorized party receiving the item, wherein: the item specific designation includes at least specific-item information including a designated item serial number, the designated item serial number being at least one of a sequential number, a numeric number, an alpha-character number, and an alpha-numeric number, and the designated item serial number being at least one of an encrypted and non-encrypted number.

According to another embodiment of the present invention, there is provided an apparatus for enabling an improved security and information transfer between a label generator generating a label for an item and an authorized party receiving the item, wherein: the composite symbology encodation further comprises at least higher-order information, and the higher-order information includes at least one of a National Drug Code (NDC) identifier, a Lot identifier, an Expiration Date identifier, a general item identifier, and an item-manufacturer identifier, whereby the apparatus enables a secure data system storage and secure assess to both the higher-order information and the specific-item information providing an improved security and an enhanced information storage capability to an item transfer between the label generator and the authorized party.

According to another embodiment of the present invention, there is provided a method for providing an improved information security during an item transfer between an initial item identifier and at least one supply chain party in a supply chain, comprising the steps of: selecting an item requiring an item specific designation, selecting an identification system for enumerating an identifier for the item from one of an industry-acceptable identification system and a custom-created identification system, enumerating a item specific designation for the item, the item specific designation including at least higher-order information and specific-item information, the specific-item information including at least a unique serial number for the item, encoding at least the specific item information in at least a first 2D bar code, applying the at least first 2D bar code to one of the item and an item label using one of a commercially acceptable off-line and a commercially acceptable online printing methods producing a 2D bar code, generating a linked security 1D bar code for the supply chain party enabling a reading of a combination of the 2D and 1D bar codes only when the 2D and 1D bar codes are physically or electronically joined, the 2D bar code and the 1D bar code being one of electronically linked/hooked codes and electronically unlinked/unhooked codes, maintaining a secure database system joining at least each item, the unique serial number for each item, and the 2D bar code in a secure data base accessible via the Internet, maintaining a secure connection between the secure data base system, the Internet, and the at least one supply chain party enabling access through at least one of an authorized use of the physically or electronically joined 1D and 2D bar codes and an authenticated use employing human enterable data, transferring the security 1D bar code to the supply chain party in a secure manner separately from the 2D bar code and the item, and allowing for a secure updating of a location of the item in the secure data base system along the supply chain, whereby the method enables a certification of a pedigree of the item via the secure data base system and limits an access to the secure data base system when the 1D and 2D bar codes are not joined.

According to another embodiment of the present invention, there is provided a system for providing an improved information security during an item transfer between an initial item identifier and at least one supply chain party in a supply chain, comprising: means for selecting an item requiring an item specific designation, means for selecting an identification system for enumerating an identifier for the item from one of an industry-acceptable identification system and/or a custom-created identification system, means for enumerating a item specific designation for the item, the item specific designation including at least higher-order information and specific-item information, the specific-item information including at least a unique serial number for the item, means for encoding at least the specific item information in at least a first 2D bar code, means for applying the at least first 2D bar code to one of the item and an item label using one of a commercially acceptable off-line and/or a commercially acceptable online printing methods producing a scannable 2D bar code when joined with a linked security 1D bar code, means for generating the linked security 1D bar code for the supply chain party enabling a reading of a combination of the 2D and 1D bar codes only when the 2D and 1D bar codes are physically or electronically joined, the 2D bar code and the 1D bar code being one of electronically linked/hooked codes and electronically unlinked/unhooked codes, means for maintaining a secure database system joining at least each item, the unique serial number for each item, and the 2D bar code in a secure data base, means for maintaining a secure connection between the secure data base system, the Internet or an intranet system, and the at least one supply chain party enabling access through at least one of an authorized use of the physically or electronically joined 1D and 2D bar codes and an authenticated use employing human enterable data, means for transferring the security 1D bar code to the supply chain party in a secure manner separately from the 2D bar code and the item, and means for allowing for a secure updating of a location of the item in the secure data base system along the supply chain, whereby the method enables a certification of at least one of an authentication and a pedigree of the item via the secure data base system and limits an access to the secure data base system when the 1D and 2D bar codes are not joined.

According to another alternative embodiment of the present invention, there is provided a method for providing improved security during an item transfer between an initial item identifier and at least one supply chain party in a supply chain, comprising: selecting an item requiring an item specific designation, selecting an identification system for enumerating an identifier for the item from one of an industry-acceptable identification system and/or a custom-created identification system, enumerating a item specific designation for the item, the item specific designation including at least higher-order information and specific-item information, the specific-item information including at least a unique serial number for the item, encoding at least the specific item information in at least a first 2D composite bar code, applying the at least first 2D composite bar code to one of the item and an item label using one of a commercially acceptable off-line and/or a commercially acceptable online printing methods, producing a readable 2D composite bar code when joined with a second security bar code, requiring the at least one supply chain party to separately secure the second security bar code enabling a reading of the first 2D composite bar code only when the first 2D composite code and the second 1D security bar code are physically or electronically joined, the first 2D composite bar code and the 1D second security code being one of electronically linked/hooked codes and electronically unlinked/unhooked codes, maintaining a secure database system joining at least each item, the unique serial number, the first 2D composite bar code, and the 1D second security code in a secure data base accessible via the Internet, enabling a secure connection between the secure data base system, the Internet, and the at least one supply chain party enabling an access to the secure data base system through at least one of an hand entry and an electronic entry of a joined 2D composite code and the 1D second security bar code, requiring an authentication of the supply chain party by a scanning of at least a first form of scannable identification prior to an accessing of the secure data base system, and allowing for a secure updating of a location of the item in the secure data base system along the supply chain, whereby the method enables a certification of a pedigree of the item via the secure data base system, allows a reporting of the same, and limits an access to the secure data base system when the first 2D composite bar code and the 1D second security bar code are not joined.

According to another embodiment of the present invention, there is provided a system for enabling an improved security and information transfer between a label generator generating a label for an item and an authorized party receiving the item, comprising: means for enumerating an item specific designation for the item, means for generating at least a machine readable composite symbology encodation for the item specific designation and for printing the composite symbology encodation on the label, the composite symbology encodation including at least a first encoded portion and a second encoded portion, the first encoded portion being a 2D symbology encodation portion, the second encoded portion being a 1D symbology encodation portion, the means for generating including means for printing a human readable encodation reference proximate respective the first and second portions of the composite symbology encodation duplicating the item specific designation, a secure master data system including the machine readable composite symbology encodation linked with the item specific designation for the item, means in the secure master data system for providing a secure access to the secure master data system by the label generator and the authorized party, and the secure master data system including means for machine entering of the machine readable composite symbology and means for human entering of the human readable references, whereby the item label enables a tracking of an item specific designation and thereby enables an improved safety feature enabling at least one of a secure human access and a secure machine access to the item specific designation to confirm an authenticity of the item.

According to another embodiment of the present invention, there is provided a system for enabling an improved security and information transfer between a label generator generating a label for an item and an authorized party receiving the item, wherein: the item specific designation includes a item serial number, the designated item serial number being at least one of a sequential number, a numeric number, an alpha-character number, and an alpha-numeric number, the designated item serial number being at least one of an encrypted and non-encrypted number, the machine readable composite symbology further comprising higher-order information, and the higher-order information including at least one of a National Drug Code (NDC) identifier, UPCA, UCC, EAN, a Lot identifier, an Expiration Date identifier, a general item identifier, and an item-manufacturer identifier or other, whereby the system enables a secure data system storage and secure assess to both the higher-order information and item specific designation providing an improved security and an enhanced information storage capability to an item transfer between the label generator and the authorized party.

The above, and other objects, features and advantages of the present invention will become apparent from the following description read in conduction with the accompanying drawings, in which like reference numerals designate the same elements.

DETAILED DESCRIPTION OF THE PREFERRED EMBODIMENTS

Figure 1:
FIG. 1 is an exemplary code specimen as discussed herein.
Figure 2:
FIG. 2 is an exemplary code specimen as discussed herein.

Bar code technologies collectively encompasses the symbologies that encode data to be optically read, the printing technologies that produce machine-readable symbols, the scanners and decoders that capture visual images of the symbologies and covert them to computer-compatible digital data, and the verifiers that validate symbol quality.

As noted earlier, there are many different bar code symbologies, or languages to use an analogy (collectively phrases), and these phrases are at present used in a manner comfortable to those skilled in the art. Each symbology has its own rules for characters (e.g. letter, number, punctuation) encodation, printing and decoding requirements, error checking, and other features.

The various bar code symbologies differ both in the way they represent data and in the type of data they can encode: some symbologies only encode numbers; other symbologies encode numbers, letters, and a few punctuation characters; still other symbologies offer encodation the 128 character set, and even 256 character sets, ASCII sets, etc.

Many construction and practical concerns remain for the wide spread use of RFID technology, and what is needed is a technology that bridges the gaps between presently known bar-code technologies (with their limitations) and the future RFID systems at the present time, and enables sufficient detail in tracking (e.g. item/lot level/container/pill/box) to meet, at lest in part, one of the goals of future RFID systems, namely individual unit pharmaceutical tracking or other specific item tracking (i.e. identifiable to a designated item for example a pill, syringe, bottle, container, pallet, box, machine, etc.). It is particularly noted that item-specific or specific-item information is critical in the high technology or pharmaceutical fields for tracking and safety but due to the very large manufacturing lot sizes, number of manufacturing plants, size of world-wide companies and for other reasons it is presently impractical to create a specific individual item serial number identifying a particular item because the identifying information will be to large to incorporate into present symbology systems. At present only higher order information (even higher-order information of great detail) cannot be used to track individual items in such large numbers as needed in various industries (e.g., individual LED or individual pill tracking) due at least in part to the large number of items involved.

Thankfully, there already exists an alternative to the negatives necessitated by the designated EPC™/RFID process (e.g., expense, altered manufacturing steps, integration difficulties etc.).

As noted earlier conventional Composite Symbology (CS), which generally incorporates a 1-D linear symbology encodation component with a 2-D Composite symbology encodation component, is a new class of symbology. In addition to the conventional broad scope of Composite Symbology (CS) encodation, the present invention additionally envisions Composite Symbology (CS) as optionally incorporating a 2D and a 2D symbology encodation scheme to provide to address applications that are not being met by current technology solution sets and provide additional encodation scope. As a consequence, relative to the present invention and despite other descriptions here, Composite Symbology (CS) should be broadly understood as a combination of two or more encodation schemes, generally a 1D and 2D scheme but now also a 2D scheme and a second or additional 2D scheme or a plurality of 1D/2D schemes.

It is also proposed that using alternative aspects of the present invention, a novel methodology exists to add Composite Symbology (CS) to existing UCC/EAN Linear symbologies, such as, but not limited to: UPC-A, UPC-E, EAN-8, EAN-13 and UCC/EAN-128; in various alternative embodiments to orchestrate this adaptation either after the UCC/EAN symbologies have been created, printed, placed on labels or other substrate; and in yet other alternative embodiments to 'link' information by means of adding information in a 2D or Composite format between the Linear and the Composite symbologies, in either a numeric or alpha-numeric or scrambled alpha-numeric format for UPC-A, UPC-E, EAN-8 and EAN-13, and UCC/EAN-128 in order to enhance, change, update, delete or link encoded data contained in the Linear.

In one alternative aspect of one embodiment of the present invention, an item to be tracked is labeled or identified as discussed below with a determined item specific designation, including for example higher order information such as associated manufacture, time, date, place, description, and NDC, and specific item information such as a serial number, and other item selective identifier effective to sufficiently identify a individual item in a discrete manner, e.g. a single ampoule of injectable medicine, or a single box containing a plurality of ampoules.

For example, alternative embodiments of the present invention may be adapted for use in various manners to improve the ability to track or identify consumer products (e.g., pharmaceuticals, livestock, books, food items, clothing items, aircraft parts, automotive parts or other manufactured parts, cargo containers, luggage, personal identification documents (drivers licenses, passports, visa's, etc.), military construction items and parts); and as a result of this tracking or identifying achieve, at least in part, one of the concerns raised in the discussion above.

In other words alternative aspects of the present invention may be adapted for use in reducing counterfeiting, tracking events (such as sporting or entertainment events), minimizing human health concerns over patient consent or privacy or drug receipt, verifying product returns and recalls, tracking vaccines and other biological materials in a private manner, or tracking personnel (e.g. military, prisoner identification), etc.

According to one alternative embodiment of the present invention, incorporating portions of this information, a first code is created (usually a linear or 1D bar code but alternatively a separate 2D or Composite (CS) code may be used as the first code.

This first code (A) (usually a linear code) is created by known technology bar code printing systems (usually by off-site printers or by in-line systems at a manufacturer's or user's production line) and would incorporate higher-level or higher-order information such as country code, manufacturer, product description, place of manufacture, etc.

A second code (B) is then created. This second code (B) includes specific defined item-level information, specific-item information, or individual-use information such as lot, serial number, pallet, date of manufacture, expiration date, URL access data etc, that is known about a determined item. This second code (B) is generated as a Composite Symbology (CS) code and includes a first part (B1) and a second part (B2), where one or both parts is a 2D composite component, and where only one part is a 2D composite component the remaining part is a 1D linear component, depending upon multiple alternative embodiments.

In other words, in one alternative embodiment the second code (here B'), includes a first part (B1) is a linear component and a second part (B2) is a 2D component. In another alternative embodiment the second code (B") includes a first part (B 1) as a first 2D component and a second part (B2) as a second 2D component.

The present invention intentionally provides a portion of the data for the second code (B) in the first part (B1) and continues that information into the second part (B2), creating a Composite Symbology code (B=B1+B2) and rendering the second code (B) unreadable without simultaneously reading (scanning with a laser scanner) both the first (B1) and second (B2) parts together, as part of a Composite Symbology code. This type of separation renders the second code (B) unreadable (un-scannable and unrecognizable) and without utility without both (B1) and (B2) or other portions as will be described.

Alternative embodiments of the present invention may optionally provide additional electronic "hooks" or "tails" in either one of the first (B I) or second parts (B2) of the second code (B) indicating to a properly programmed electronic reader that the other part of the second code (B) is a required element to the second code (rendering the Composite Symbology (CS) Code unreadable when separated) and preventing the reading of the second code (B) where either part (B1, B2) is lacking.

Alternative embodiments to this embodiment may optionally further divide the second code (B) into a third (B3) or even a forth part (B4), rendering the second code (B) unreadable without physically combining all the parts (B1, B2, B3, or B4).

In another alternative embodiment the first code (A) may be similarly physically split into a first part (A1) and a second part (A2) and operate in a similar 'unreadable' manner for an additional layer of counterfeit protection. In this alternative embodiment, the item-label would be printed with two partial codes, for example A1 and B2, (requiring A2 and B1 for comprehensive scanning) thereby preventing scanning at even the higher-level order of information.

As an additional alternative embodiment, in either code (first code (A) or second code (B) human readable information may be printed immediately adjacent the code allowing for human-reading of the human-readable information and entering the information in a secure data base to reconstruct a damaged and un-scannable CS code based on the stored specific-item information.

As a consequence of the present design, a manufacturer, employing the present system, method, product, or apparatus would first initially generate a list of desired tracking information including higher-level and item-level, specific-item, or individual-use information and store that information in a secure "track-able" and useable database system specific to the individual or use. An alternative embodiment to the database system would provide an internet-linked or internet-based system allowing access from multiple geographically dispersed locations (or authorized supply chain partners) each accessible via a secured communication link.

In a first example of one alternative embodiment, for a single use item, e.g. single ampoule of medicine, the manufacture would electronically designate a first code (A) using CS or other technology code containing only higher-level information, and a second code (B) containing either both higher-level and item-level information or only item-level information, wherein the second code (B) is divided into at least a first part (B1) and a second part (B2). It should be understood, that the selection of which type of information (serial number, pallet number, part number etc.) to encode using the present embodiment of the invention is a decision for the individual user.

In an alternative embodiment, where an industry is common to individual users (e.g., the drug industry), the users may collectively designate a third party to uniformly designate an information strategy for specific-item information (i.e. following a specific item-information encodation format for all drugs) and hence bring convenient unity to the industry and benefit all individuals. This third party would then provide designated information units in a common data base or set of data bases to each user for incorporation with their secure scanning methods and application to designated specific items.

In this example, the manufacture would then cause a physical item label to be printed for an item including the first code (A) and only one part or portion (B1 or B2) of the second code (B).

The manufacturer would then provide the non-selected part (B1 or B2) of the second code (B) in a secure manner to an authorized end user (Doctor, pharmacy, Hospital user etc.) trained in its use. This type of secure manner may include placing the non-selected part (of second code (B)) on a user specific 1D card identifiable to a person, on a scannable card, or in other physical and electronic ways (programmed into a scanner or scanning control system, etc) common to conventional bar code uses. Thus a two-path delivery practice is provided for at least the physically split second code (B). One path being the label itself, and the second path being the secure transfer to the authorized end user.

As a consequence, the specific item label may be read by scanning the first code (A) into a data base and noting higher-level information (NDC, Manufacturer, etc.) but the label cannot be read by scanning the second code (B) without both parts. Thus, a counterfeiter, forger, or unauthorized user merely copying duplicating an existing label (e. g., stolen or lost label) cannot complete an electronic entry scan (and detect the code elements themselves) because the second code (B) cannot be read without both parts (B1, B2).

An authorized user would scan the first code (A) on the label into the data base and then by completing code (B) (by either physically holding the unused part of the second code (B1) next to printed part (B2) and physically completing the second code (B) or by electronically combining (B1) and (B2) via computer programming solutions) thereby allowing for a completed and successful specific-item or item-level scan of the second code (B) and hence the entire label. The present invention may be adapted and modified in alternative embodiments according to the situational security needs of the manufacture and customer. Several of the optional alternative embodiments are discussed below.

In an example 5 of one alternative embodiment of the present invention, a 1-D UPC-A Linear code is created with numeric values as shown. See FIG. 12. which when scanned would scan as: 312345678906

As more information becomes available, a 2-D Composite is created. See FIG. 13 and, because this 2-D composite is not a stand alone readable composite code it cannot be scanned alone, but does include selected critical encoded information, e.g. item-level information such as expiration date, lot number, part or item serial number ((17)040404 (10)abc123) etc.

Figure 12:
FIG. 12 is an exemplary code specimen as discussed herein.
Figure 13:
FIG. 13 is an exemplary code specimen as discussed herein.

In this example, unreadable FIG. 13 may optionally be placed on a drug bottle, a syringe body, or on a single specific-item label, and FIG. 12 supplied in a secure manner (physically or electronically) to an authorized end user. When the authorized user combines FIGS. 12 and 13 (physically or electronically) the completed code maybe read providing a complete amount of item-level information.

When FIG. 13 is combined and added to the Linear it would look like this. See FIG. 14.

Figure 14:
FIG. 14 is an exemplary code specimen as discussed herein.

Combined Symbology FIG. 14 would therefore scan (by suitably enabled bar code scanners or readers) as: 312345678906(17)040404(10)abc123. In sum, according to this one alternative embodiment of the present invention, the first and second parts of the second code (or even alternatively a first code for simplicity) may be physically separated (printed separately) and separately provided to an end user, preventing copying by counterfeiters and guaranteeing that only the authorized end user employing the separately-provided part of the second code could reassemble the second code for a successful scan.

Figure 15:
FIG. 15 is an exemplary code specimen as discussed herein.
Figure 16:
FIG. 16 is an exemplary code specimen as discussed herein.
Figure 17:
FIG. 17 is an exemplary code specimen as discussed herein.

In an example 6, another alternative embodiment of the present invention provides (e.g. a manufacturer) a portion of the continuous item-level data in a 1-D Linear code (a 1D symbology encodation) and continues said information in the Composite code thereby providing a security link that enhances the value and secure utility of the machine readable CS bar code. Thus, in the present example, if for example a manufacturer created a UCC/EAN-128 1-D Linear code with the start of a phrase: "Now is the time for" (See FIG. 15) and subsequently added a Composite Code (2D symbology encodation) portion (See FIG. 16) that contained the finishing phrase: "all good men" and, physically (placing them adjacent) or electronically (through scanning code or programming) 're-constructed' the original security phrase into a now machine-readable Composite Symbology (CS) bar code, it would look like this but remain unreadable without both portions. See FIG. 17.

Figure 18:
FIG. 18 is an exemplary code specimen as discussed herein.

In an example 7, where a 1-D Linear portion of a UCC/EAN-128 bar code contained the following portion of a URL. See FIG. 18.

Figure 19:
FIG. 19 is an exemplary code specimen as discussed herein.

This coded portion would scan as: www.anywebsite, but without the complete web address contained in the Composite Symbology mark as follows. See FIG. 19.

Similarly, scanning this part of the composite code will not create a URL that could access the correct site.

Figure 20:
FIG. 20 is an exemplary code specimen as discussed herein.

However, by physically or electrically re-constructing the 'full' composite symbology code, the ensuing code would look like this. See FIG. 20. and this reconstruction would (via scanning software programming) necessarily create a URL as: www.anywebcite.com/additional/secret and therefore be a "security enabled" URL contained in an enhanced and reconstructed UCC/EAN-128 with Composite bar code according to one alternative embodiment of the present invention.

In another alternative or optional embodiment of the present invention, it is envisioned that a portion of the code may contain a portion of a secure URL or secure URL accessing authorization in the 1-D Linear portion and continue the URL address into the Composite 2-D portion, enabling the creation of a secure and coded hyperlink to send a validated scanner unit or computer (employing the secure separated part of the code) via the hyperlink to a secure website on the World Wide Web for access to specific-item information. Since the Composite Symbology code is only readable when both portions are combined or electronically entered, an unauthorized user cannot access the web cite with only a portion of the Composite Symbology.

In an example 8, another optional alternative embodiment employing aspects of the present invention, dictates how important and/or life saving information may be added to a pre-existing UPC or EAN Linear bar code (it is noted herein, that any of the preceding embodiments may be similarly added to a preexisting label), maintained in confidence (according to the present invention) and be constructed/reconstructed by an authorized end user employing the missing code portion.

Figure 21:
FIG. 21 is an exemplary code specimen as discussed herein.

In the present alternative embodiment, a 1-D UPC-A Linear bar code contains numeric information about a product (for example a Candy Bar). See FIG. 21.

Figure 22:
FIG. 22 is an exemplary code specimen as discussed herein.

A manufacturer (of the Candy Bar) or end user (store) recognizing that it is critical to add important life-saving information to the product label creates an item-level numeric identifier (specific-item identifier), such as WARNING CONTAINS NUTS to the secure specific-item database in an encoded manner and creates a 2D Composite code containing this information as an addendum to the Linear code above. See FIG. 22. It is noted that ways to create a 2D composite code are well known and include using a hand held, mechanical or powered thermal transfer, laser or ink jet printers capable of printing said composite code, or complete 1D and 2D composite bar codes such as: RSS and it's composites, UPC-A, EAN, UCC/EAN-128 and it's composites.

Figure 23:
FIG. 23 is an exemplary code specimen as discussed herein.

An authorized user would then physically add or reconstruct the symbols to result in a 'complete' Composite Symbology code that can be scanned or read by suitably programmed scanners or readers. See FIG. 23.

Figure 24:
FIG. 24 is an exemplary code specimen as discussed herein.

In an example 9, according to another alternative embodiment of the present invention, an existing UPC or EAN bar code may be optionally "upgraded" into a secure Composite code to reflect, for example, a change in price after the item was finally priced and a UPC or EAN code label generated and applied to the product. See FIG. 24.

Figure 25:
FIG. 25 is an exemplary code specimen as discussed herein.

Here, a 2-D Composite may be created by an authorized manufacture, distributor, or end user is built to reflect the particular price change, e.g. 10% discount before Dec. 31, 2003. See FIG. 25.

Figure 26:
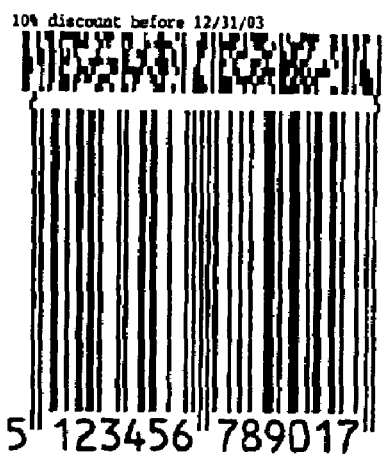
FIG. 26 is an exemplary code specimen as discussed herein.

This additional code may then be supplied to an end distributor or user (e.g., a store owner) and applied at various stations along the supply chain. As a consequence, an authorized user along the supply chain could securely re-construct the specific information in the following manner enabling the purchasing system in a store to recover the sales discount information and, linked with the purchasing system, charge a customer a revised price. See FIG. 26.

In an example 10, another alternative embodiment of the present invention provides an improvement for Human or Animal Drug information transfer (such as a newly discovered adverse drug interaction or information location for a pharmacist) would result by re-constructing the information that could exist in a bar code involving the UCC/EAN family of bar codes.

Figure 27:
FIG. 27 is an exemplary code specimen as discussed herein.

In a first event, an exemplary Drug company designs and creates an RSS 1D Linear bar code for a pharmaceutical item. See FIG. 27.

Figure 28:
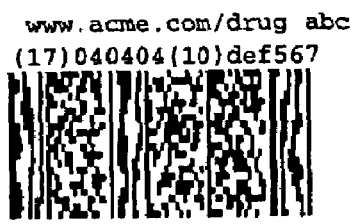
FIG. 28 is an exemplary code specimen as discussed herein.

The drug company thereafter realizes important information must be added (during the manufacturing or shipping process) to the Linear 1D code in addition to the Expiration Date and Lot Number, but does not have sufficient room to apply a completely new code to a box or bottle, even where using a small-sized 2D Composite code. The Drug Company, therefore adds only a hyperlink to a designated web-page containing all the relevant information, but still keeps a small code-footprint. Thus, according to this particular alternative embodiment of the present invention, the 2-D Composite could look like this. See FIG. 28.

Figure 29:
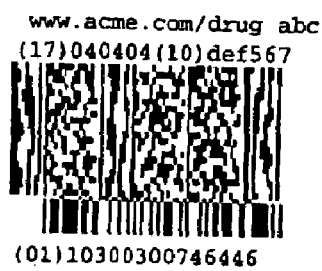
FIG. 29 is an exemplary code specimen as discussed herein.

And when combined in a Composite Symbology in a completed RSS-14 1D linear bar code with a 2-D Composite that would look like this. See FIG. 29.

In this exemplary embodiment, this mark (FIG. 29) would scan as:(01)00300766446 www.acme.com/drugabc (17) 040404(10)def567 and could still be readily adapted to several anti-counterfeiting or additional security measures as discussed elsewhere herein.

It should be understood, that as used herein the phrases reconstructed, constructed, recombined, assembled etc. refer to the practice of recombining portions of a separated Composite Code (either 1D/2D or 2D/2D) code and enabling access to item level or specific-item type information designated by a user and stored in an accessible and secure database.

Those skilled in the art will readily recognize that the present invention readily enables the construction, de-constructing and re-constructing of existing 1-D Linear bar codes with the addition or deletion of a 2-D Composite code and can thereby enhance the existing Linear UCC/EAN family of bar codes in the Public and Private sectors while adaptively positioning the completed combined code (Composite Symbology code) for secure separation.

Specifically regarding the non-RSS-14 family of UCC/EAN bar codes that can accept a Composite Component (CC) e.g., UPC-A, UPC-E, EAN-8, EAN-13 and UCC/EAN-128; it is noted that the group of UCC/EAN bar codes that does not require an encoded 'link' from the 1D Linear to add the Composite Component, is where at least one of the suggested alternative embodiments of this invention reside.

In another alternative embodiment of the present invention, a method is set forth allowing the storage of EPC™ type specific-item level information encoded in a secure Composite Symbology involving 2D bar codes and transmitting the information to an internet-based and/or intranet-based database in much the same manner as the expensive RFID tag for a fraction of the cost per EPC™, requiring minimal supportive infrastructure.

In this present optional and alternative embodiment, an exemplary manufacturer may conduct the following exemplary steps:

1. Identifying a product for manufacture and coding identification.
2. Determining the numbering system used, i.e.: UPC-A, UPC-E, NDC, UPN, EAN-13, EAN-8, EPC™, or other industry specific enumerators.
3. Enumerating (where needed) the prefix for country according to the numbering system.
4. Enumerating (where needed) the packaging level according to the numbering system.
5. Enumerating the designated manufacturer number according to the numbering system.
6. Enumerating the item by type, object, size, amount, transmission, lot, expiration date, or other higher-order information identifiers according an industry specific need, in the format of the numbering system selected.
7. Enumerating a unique specific-item designator (ex. serial number) for each individual item (ex. each pill, each dose, each unit, each person, each product, or other item depending upon the manufacturer's needs).
8. Incorporating the designated unique serial number for that specific item in a 2-D bar code, either encrypted or not, or optionally requiring or not a hook or link in the 2-D code to a second code (1-D) code to enable scanning/reading of the combined 2-D/1-D code, and decoding scanning/reading of the 2-D code by itself.
9. Applying that 2-D bar code to the product by commercially accepted offline or online printing methods producing a scannable 2-D bar code.
10. Generating a linked security 1-D bar code enabling reading of combination of the scannable/readable 2-D code and the 1-D code (for each designated supply chain individual) only when joined physically or electronically joined during the scanning/reading process.
11. Maintaining a secure database of each item and its unique specific-item identifying numbers, 2-D bar code, and authorized (linked/hooked or unlinked/unhooked) 1-D bar code.

12. Maintaining that database on in-house or on the World Wide Web for supply chain tracking or other tracking purposes (i.e. delivery or return purposes) for authorized supply chain partners, with access to the World Wide Web via computer and appropriately programmed scanners enabling access only through the use of the authorized 1-D bar code during joint/combined scanning with the unique 2-D bar code.
13. Allowing for updating the location or change in Composite Symbology makeup or amount of that specific labeled item by authorized opt-in supply chain partners using the authorized 1-D code with access to the World Wide Web when combining/recombining/decoding the 2-D code with the secure 1-D bar code.
14. Enabling the certification of pedigree of that specific item from initial labeler or manufacturer to end user (and during an optional return or recall practice) via computer and an appropriate connected or wireless scanning or optical code reader with access to the World Wide Web. Where along each step of the supply chain the unique 1-D bar code limits access to the database when not scanned in conjunction with the authorized 2-D bar code or through another authorized Internet forensic method of access (e.g., secure passwords, fingerprints, voice, eye, DNA scans etc.)

In another alternative and optional embodiment of one aspect of the present invention for ensuring the security for uniquely identifiable products, a manufacturer may follow the steps of:

1. Identifying a product for manufacture.
2. Determining the numbering system used, i.e.: UPC-A, UPC-E, NDC, UPN, EAN-13, EAN-8, EPC™, or other industry specific enumerators.
3. Enumerating (where needed) the prefix for country according to the numbering system.
4. Enumerating (where needed) the packaging level according to the numbering system.
5. Enumerating the manufacturer number according to the numbering system.
6. Enumerating the item according to the numbering system (by type, object, size, amount, transmission, lot, expiration date, or other identifiers according industry specific need, in the format of the numbering system used).
7. Enumerating a unique specific-item designator (ex. serial number) for each item according to a designators determination of item-specific information.
8. Incorporating the unique serial number for that specific item into the 2D Composite part of an RSS bar code, i.e.: any 2D symbology or composite symbology for example a-RSS Limited, b-RSS Stacked, c-RSS Truncated, d-RSS Expanded e-RSS-14, Data Matrix etc.,
9. or in other optional and alternative embodiments into the 2D Composite portion of: an e-UCC/EAN-128, f-UPC-A, g-UPC-E, h-EAN-8, i-EAN-13 or other code.
10. Applying that 2D bar code to the product by commercially accepted out-side or inside offline or online printing methods that would reproduce a scannable bar code (but for any intentionally created scanning prohibitions).
11. Maintaining a database of at least each designated item and its unique identifying item-number and designated 2D Composite bar code.
12. Maintaining the database on the World Wide Web for authorized-user supply chain access and tracking for authorized supply chain partners provided with secure access to the World Wide Web via computer and appropriately programmed scanners or readers.
13. Requiring that supply chain partners securely-retain the secure and designated one-dimensional (1D) or Linear portion of the appropriate 2D bar code used on the product, without which, the information in the 2D Composite cannot be read (1D and 2D portions are electronically hooked together).
14. Allowing for the (optional) inclusion in that Linear 1D bar code of supply chain partner specific information about that partner for identification or tracking purposes through globally recognized or trading partner agreed-upon Application Identifiers (ex. (10) for expiration date but other identifiers may be optionally selected).
15. Including in specially pre-programmed bar code scanners (or other electronic reading systems) that authorized supply chain partners are in possession of a designated URL for a specific (optionally access-restricted) web address on the World Wide Web for accessing the information storage and accessing database.
16. Allowing supply Chain partners, with pre-programmed scanners attached to a computer with access to the World Wide Web to scan the re-constructed combined 1-D and 2-D Composite bar code (Composite Symbology).
17. Optionally allowing for the utilization of computer CPU designation authorization via an Application Software Platform linked to a specified server on the World Wide Web hosting or providing access to the secure or master database or system (e.g. the designated CPU designation provides an optional additional level of security).
18. Optionally allowing for the authorized access to specific and secure website(s) for purposes of authenticating the pedigree of a specific product along a supply chain tracked via the master data system (alternative called in some embodiments an authorized-use accessible storage system)
19. Requiring Log-in authentication of supply chain partners by (in this alternative embodiment) scanning at least a form of scannable identification (optionally in addition to other authentication features including passwords) so that the master data system can track which identification is used to access the data system.
20. Requiring entering of specific-item or item-specific information relating to the item being scanned (via hand entry where the physical code label is damaged or by scanning/reading in a manner discussed above).
21. Optionally allowing for comparing entered item data to the item information stored on the database.
22. Optionally allowing for updating the location or other change to the specific-item information (e.g., item or amounts, strengths or other identifiable changes relating to a specific item) of that specific item by authorized supply chain partners with access to the World Wide Web via computer.
23. Recording the entry of each specific item for each authorized supply chain partner whereby a report of such authorized entry (or report of rejected unauthorized attempted entry) and partner provides a certifiable pedigree chain of that a specific designated item from the specific manufacturer to end users via computer with access to the World Wide Web.

As used herein and elsewhere, the phrase product and/or items should be understood as a word-label used by a manufacturer in a particular circumstance. For example, a drug company may use the phrase "item" to identify a single dose (1-pill or 1-ampoule) of a drug but may simultaneously use the phrase "product" or "item" to identify a single package containing a single drug product (1-pill or ampoule) or several drug products (10 pills). Alternatively, a shipping company may designate tracking an "item" or a "product" as a pallet containing multiple-packaged items (products) designated as suitable for item-specific tracking purposes of the shipping company.

As also used herein the phrases data base, storage system, or internet data base or controlling system or managing program should be generally understood to represent a type of software (and optionally including hardware) system capable of maintaining a secure and authorized-use accessible data base or storage system (either on the internet or within an intranet or elsewhere) effective to act in any of the manners described herein (i.e., receiving and storing item specific designations, encoding these designations, printing labels and encoded portions of an encoded item specific designation, updating along the supply chain, issuing pedigree, tracking, and authorized user reports, or counterfeit, stolen, or lost goods reports, tracking access, updating information, rebuilding damaged Composite Symbology labels etc.)

In a combined alternative example, a drug company may generate an "item a" identifier (e.g. specific pill/pill), a "product a" box identifier (e.g. box of 5 ampoules/pills), a larger "product b" box identifier (e.g. a box containing 10 boxes of 5 ampoules/pills) and a shipping company may designate an "item b" identifier (e.g., a single pallet containing 50 boxes of 10 boxes of 5 ampoules/pills). Each of these serialized numbers may be tracked/linked with shipper/manufacturer or third-party databases or a master data system for tracking along the supply/return/delivery/loss/recover chain depending upon a particular parties' and partner's tracking needs.

In sum, it should be recognized that the instant system or methodology is readily adapted to via variety of uses and methods across a spectrum of business and business systems depending upon where, when, and how the methodology is implemented.

As a consequence, and due to the variable nature of the English language and the variation of designated tracking identifiers across multiple industries, where the present descriptions use the phrase "item" or "product" or other identifying label, it should be considered a general or descriptive label unless a specific example (pill, bottle, container, person, syringe etc., or a particular industry restricts the meaning.

Referring now to FIG. 1, one optional and alternative method for practicing aspects of the present invention is described employing at least one safety and security feature of comparing a chain partner's computer CPU identifier with an accepted identifier in the secure database or separately issuing a component of a Composite Symbology code to an authorized partner.

In the present method, in a first step 1 a manufacturer makes a decision to identify a "product" or selected specific "item" and in a second step 2 assigns and designates an item specific numbering system providing a specific 1D containing all the information the manufacturer determines should be tracked for that specific "product" or "item."

In a third step 3 the manufacturer assigns a unit specific serial or designated number to the product and in a fourth step 4 authorizes a designated party to create a 2D composite bar code for that particular item or product in a known selectable type of composite code system. An example of a 2D composite bar code is provided.

It should be understood, that this 2D composite bar code may optionally include coded "hooks" requiring simultaneous scanning or electronic "reading" (with a data base system) a linked 1D bar code to complete a scan and access the product/unit data base list.

It is also optionally acceptable that the 2D composite code does not include "hooks" and that instead, accessing the product/unit/item data base requires scanning a verified and authenticated 1D or 2D code to gain access to the data base system in conjunction with scanning the 2D code, thereby preventing authorized entry of the scannable 2D code without having previously accessed the data base via the non-hooked 1D/2D code.

In a fifth step 5, the bar code is printed through commercially accepted printing methods, either off site or on site (manufacturing location), including but not limited to methods such as flexographic, letter press, ink jet, laser, thermal, or other non-enumerated printing method.

In a sixth step 6, through a scanning program on-site, the 1D or 2D or combination of both are scanned and the serial numbers stored in a master data system. In the case of an individual item, the label is then applied to the product or package. In a case where a label to be printed for a multi-item container is used, each item label is scanned and when a preset amount is reached, the scanner sends a signal to a down stream printer for the generation of a label with the corresponding information including all of the item-specific numbers (e.g., serial numbers) included in the box, carton, pallet, container or other packing to be applied to the designated container or packaging.

In a seventh step 7, the designated item, label, or package is then shipped to a supply chain partner wishing to securely verify both the receipt and of the authentic nature of the item/product. In this example, the supply chain partner has already generated or received a secure 1D or 2D partner specific bar code linked in the manufacturers or other's master database including the specific-item information and optionally linked to a designated partner/user/employee/specific scanner or CPU etc.

In an eighth step 8, the supply chain partner physically holds (or electronically combines) the partner specific 1D bar code (one example shown) adjacent the 2D composite code thereby physically (or electronically) reconstructing in step 9 the complete scannable composite 1D+2D bar code (Composite Symbology code). The combined codes are shown in representation.

In step 10, the complete 1D+2D bar code is scanned with a scanner containing or linked with a computer containing a specific access mechanism (e.g., secure URL address for accessing an Internet database). In step 11, the supply chain partner's scanner's CPU identifier tag (unique to each CPU) is compared by the master data system to an authorized user's CPU tag and accepted or rejected (this is one optional additional security feature).

In an optional step 12, the supply chain partner is then prompted to log-in verifying information (via key board or additional bar code scan) and is accepted or rejected (an additional optional security feature). In step 13, where the supply chain partner is verified, the combined 1D and composite 2D bar code information is entered (physically where a label is damaged or electronically scanned) into the secure database system and compared to a manufacturer's authentic item/product information.

In a final step 14 the data base system then renders a determination/authentication regarding the item/product and the user and may optionally generate a pedigree/approval/rejection report or electronic notice comparing the received information and the stored information and (if authorized) optionally update the database information and location of the item/product at the supply chain partner.

Figure 10A:
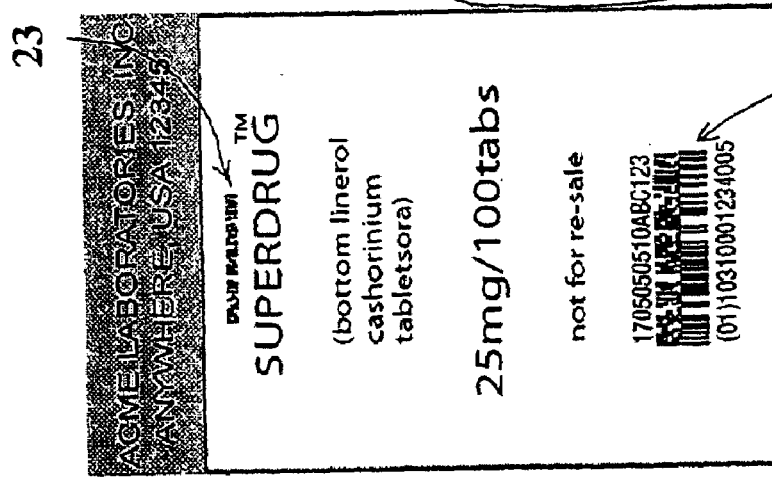
FIG. 10A is a representative example of a label according to one alternative embodiment of the present invention.
Figure 10B:
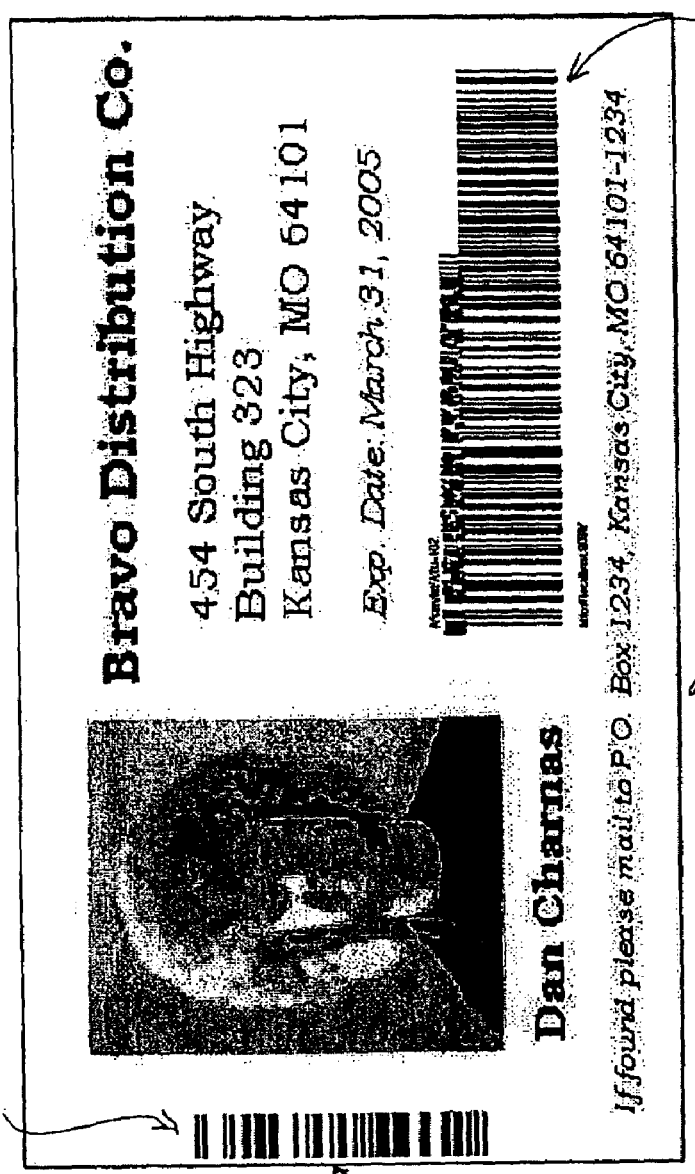
FIG. 10B is one representative example of a secure identification tag according to the alternative embodiment shown in FIG. 10A.
Figure 11:
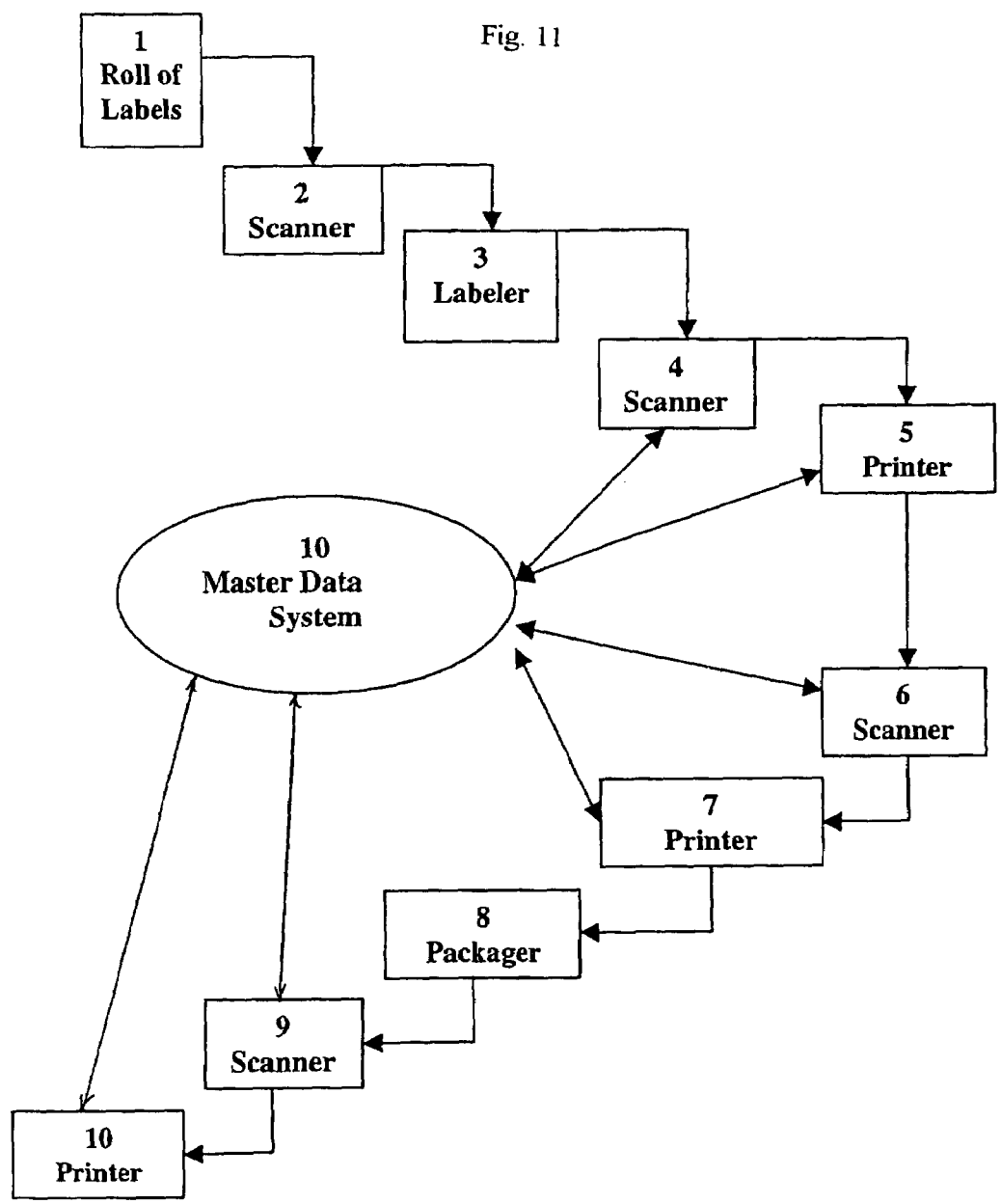
FIG. 11 is a descriptive diagram depicting steps in a labeling process according to one alternative embodiment of the present invention.

Referring now to FIGS. 10A and 10B, one alternative embodiment of the present invention is described employing a designated unit/item/product label 20 and a supply chain authorized employee identification badge 21. In this embodiment, a database or master management system is subsumed and linked with the Internet or other means (internal or external to a location) to an employee workstation employing a scanner/reader. In this alternative embodiment, label 20 is optionally placed on a single bottle of a product (SuperDrug™) containing 100 tablets each of 25 mg. It is envisioned that in alternative embodiments, label 20 may be modified depending upon a manufacturer or suppliers' needs (e.g., a pallet identifier for a shipping company, a single container for a container company, a cosmetic container or package, or a single tablet or single syringe or injectable ampoule for a drug manufacturer).

Label 20 includes a first manufacturer-specific composite 1D/2D general identifier bar code portion 22 covering, for example the NDC and expiration information (including duplicate readable portions) and a second split or de-constructed item-specific 2D security composite bar code portion 23 requiring a "hook" or linked code to enable actual reading of code portion 23.

Identification badge 21 includes a supply chain partner composite code 24 securely identifying the employee. Here, it should be recognized that supply chain partner code 24 is optionally created by the partner for internal tracking of the employee or for other uses determined by the supply chain partner. One example of using code 24 would enable the employee to access a protected computer/CPU in a shipping/receiving location or pharmaceutical lab location, and to operate that computer to log-in or log-out specific received or returned items.

Identification badge 21 additionally includes the 1D bar code 25 that is the second half of the split or de-constructed security composite code portion 23 in label 20. Code 25 may be optionally individually readable (without composite code portion 23) or not depending upon the preferences of the manufacturer, the designer of the secure tracking system, or the supply chain partner. In the present example, bar code 25 is a single readable 1D linear code "hooked" to composite code portion 23.

In use, the employee physically places an edge 26 of badge 21 and specifically 1D code portion 25 closely adjacent 2D composite code portion 23 and then holds a scanner (not shown) in a position to read both 1D code portion 25 and code portion 23 at the same time. The authorized employee then scans the now physically re-combined composite 1D/2D bar code. Since the physical combination of codes enables the scanner to actually scan the combined codes and interpretation of the code language, where either code portion is physically missing code portion 23 cannot be read.

In this embodiment, since code portion 23 cannot be read without authorized code portion 25, and since the combination of code portions 23/25 are specific to an individually designated item/product enabling a database to be updated only a single time and rejecting all other attempts, where code portion 23 is duplicated and re-scanned (by a copyist, infringer, or in error), the manufacturer's and supply chain partner's database will reject the item/product scan as a counterfeit, infringing, or previously scanned item and notify designated individuals according to an optional programming loop. In this manner, the pedigree and authenticity of a single item/product may be protected and consumer confidence or patient safety improved.

In an adaptation of the present alternative embodiment, an underlying security and authentication system enables an electronic or printed flag to be provided to designated individual upon the entry or attempted entry of a scan. In this manner, where a manufacture reports lost or stolen items, the data base flags those specific items, and if the items are rescanned in an unexpected location or by an unauthorized supply chain partner the system will reject the attempted scan and report the attempted counterfeit to the manufacturer.

In another adaptation of the present alternative embodiment, an overt type (custom developed for a particular location) authentication system or means tracks a specific employee entered-access time and location on a master control system and also tracks individual scanning events and links to the authorized item data base. As a consequence, where unexpected scans occur, the over system can track and record a particular scan to a particular individual and location.

Figure 3:
FIG. 3 is an exemplary code specimen as discussed herein.
Figure 4:
FIG. 4 is an exemplary code specimen as discussed herein.
Figure 5:
FIG. 5 is an exemplary code specimen as discussed herein.
Figure 6:
FIG. 6 is an exemplary code specimen as discussed herein.
Figure 7:
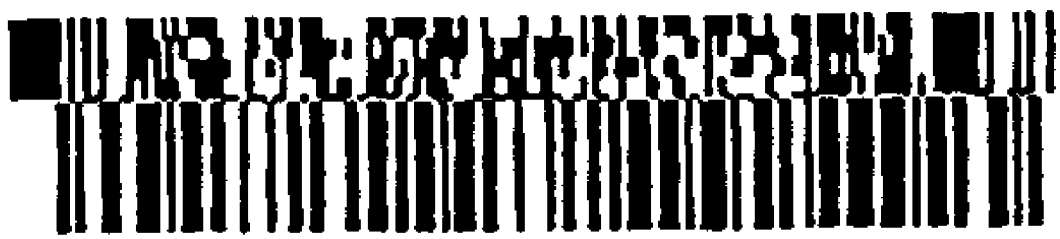
FIG. 7 is an exemplary code specimen as discussed herein.
Figure 8:
FIG. 8 is an exemplary code specimen as discussed herein.
Figure 9:
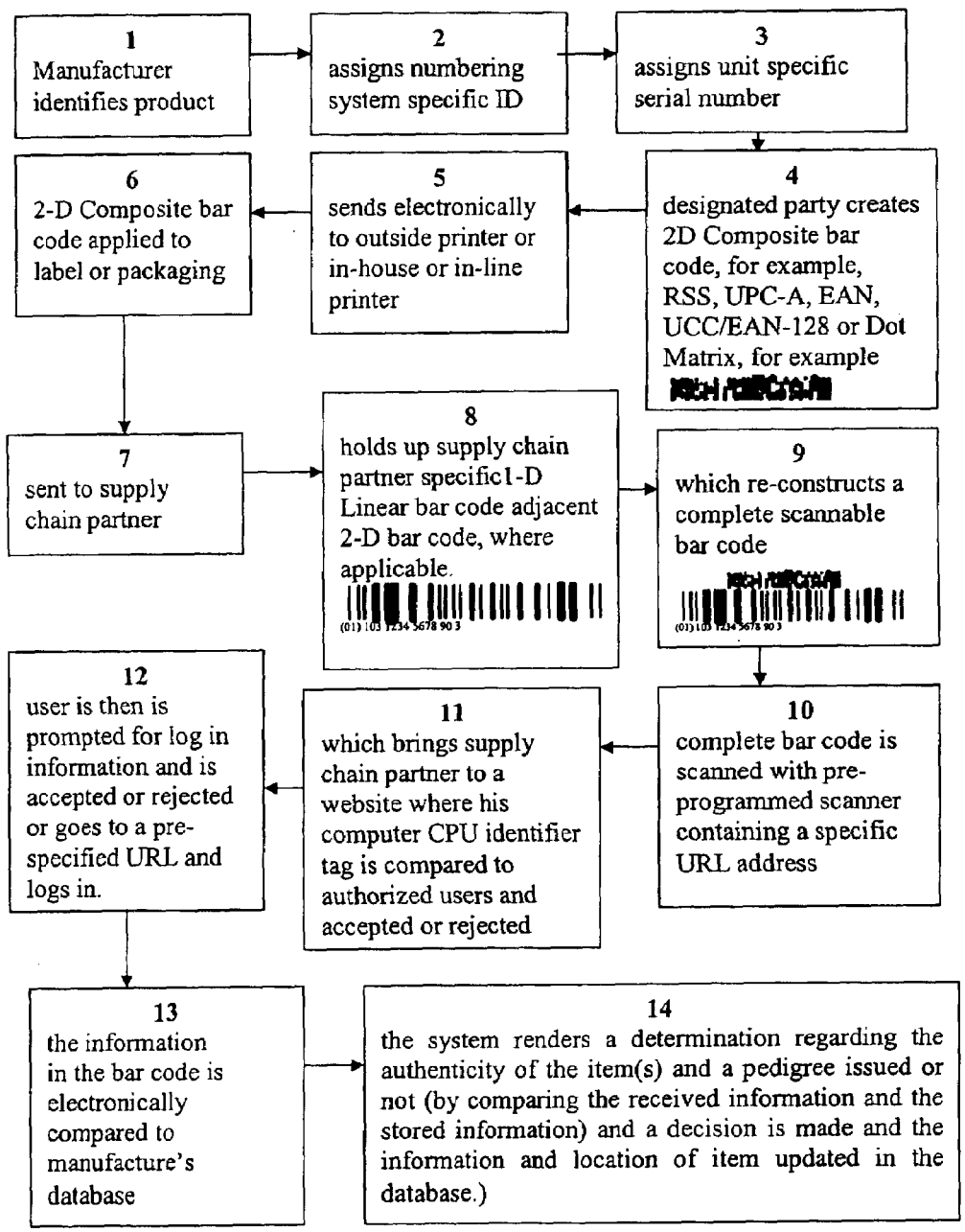
FIG. 9 is a flow diagram describing selected steps of one alternative embodiment of the present invention.

Referring now to FIG. 3, another alternative method for practicing one aspect of the present invention is visually described in reference to an individual designated item/product packaging code combined with a second individual (multiple item container) designated code at a manufacture. In this alternative embodiment, a master data and access/control system 10 either generates individualized numbers for each product as the products are created via an electronic assembly line link (not shown) or via human input and generates a list of unassigned individualized numbers awaiting assignment to a specific items or products undergoing production.

It should be understood by those skilled in the arts of process and production control, that while one alternative scenario and method for the present invention is shown in FIG. 3 additional alternative embodiments are considered without departing from the scope and spirit of the present invention. For example, master data system 10 may additionally include process control systems and links to any of the selected items (1–10 or other common processing items not shown) that fictions is actively to control a speed and action of the process labeling, recording, scanning, and coding process itself in addition to monitoring and recording code identifiers. As a consequence, it should be understood that system 10 may be selected from a plurality of systems capable of both the minimal steps discussed below and the much broader opportunities available in active process control systems, and as such may include additional established electronic links (not shown) and additional control or monitoring modules.

As shown in the present alternative embodiment, in a first step a roll (for example) of labels 1 is placed onto a packaging line and a scanner 2 regulates movement of the labels into a labeler 3 where the product is labeled with a readable 1D label as the product passes by. It should be noted, that where the item designations are pre-created off-site there may (optionally) be no need to link labeler 3 to a master data system 10; however, where the item designations are created in situ there may be a link (not shown) between labeler 3, scanner 2, etc. and master data base system 10. It should be noted that depending upon a manufacture and type of process control involved, each step or element may be combined with a master data base or master control system to both manage secure labeling and the production process.

After labeler 3 applies a label, a scanner 4 in optional communication with master data system 10, regulates the passage of the product/label combination under a printer 10 to print head or mechanism in a conventionally known method of printing 5 which either prints a coded specific-item information (e.g., serial number) in a bar code format (with or without human readables), and/or prints an individualized serial number (item identifier) specific to that product into the existing 2D composite containing other identification such as, but not limited to lot/batch, expiration, quantity, etc. Optionally both scanner 4 and printer 5, or even the process control machinery itself (not shown), may access or be controlled by a master data base system linking each product to each label and to each bar code generated in the process. In another optional embodiment of the present invention labeler 3 prints a designated item code on the label prior to application to the product itself As the now-labeled product passes through a scanner 6, the label and code is linked with the master data system 10, which reads and records the pertinent individual item data to the master data system 10, including the designated serial numbers and, after a pre-arranged amount of product passes by, master data system 10 signals this item-specific information (manufacturer number/NDC etc, product information, lot or batch number, and the first and last serial number) to the down-line printer head 7 (also linked with master data system 10).

Printer 7 prints a label for a now-full package (this now-full package (item) label number is also recorded in master data system 10 linked to the individual item numbers). The label is applied to the package containing the individual items/products and a packager 8 accessing the now-full package closes and seals the package and sends the package down-line to a scanner 9 that scans the full-package label and records the box number in the master data system 10. In additional steps (not shown) when a sufficient number of full-packages are placed on a shipping pallet or in a shipping container a printer 10 prints a pallet-specific bar code incorporating or linking in the data base all the previous codes (full-package items and product-items) and with corresponding serial numbers therein. This last label is then supplied to the sealed pallet containing all the boxes and items/products.

It should be additionally understood, that in the embodiment described, the present invention easily mimics the multi-level item-specific capacity of the more expensive and presently-unworkable RFID system providing substantial cost savings and eliminating the detriments of the RFID system noted earlier. Additionally, the present system, establishes the present practice of multi-level specific-item information tracking (and the supportive data base systems) that must be in place throughout a designated supply chain for a comprehensive transition to the RFID system in the future.

In this alternative embodiment, a manufacturer can scan the entire coded pallet label identifying (via secure data base linking) all the individual serial numbers prior to shipping and record their exit from the manufacturing plant in a manner to that similarly envisioned by the RFID system without the required added infrastructure.

A shipper can scan and record the pallet serialized ID number and record receipt in the data based linked with the manufacturer. The shipper opens the pallet and then scans each individualized box or item/product as it is delivered in a manner linked with master data system 10, another designated system (on the Web), or not depending upon a shipper's desire.

The authorized receiver or end user then scans the pallet level secure code acknowledging each individualized box or item/product upon receipt via the above described process in a manner linked with the master data base thereby receiving authentication and verification that the items/products received were actually manufactured by the manufacturer and have a pedigree. In sum, at least one embodiment of the present invention serves as simple pedigree verification means allowing a single authorized scan to record each individual product in or on a pallet or other container.

In another alternative embodiment, where the authorized receiver repacks selective boxes for re-shipping to other supply chain partners the master system may optionally provide another way to print and secure additional supply chain master labels linked with the master system. In this way, when secondary-level revisions are made the present invention allows an additional level of security for the additional supply chain partners enabling secure and authorizing scans of individual product codes in a single scan. Finally, where end users open individual boxes, via secure links to the master database and employing designated and secure coded information, an authorized user may scan an individual item/product and provide proof of receipt to the original manufacturer or receive information regarding the original manufactured product, including for example, original amounts, strengths, lots, expiration dates, NDC, or other identifying enumerators.

In sum, the present invention is easily adapted to a wide variety of scenario's adaptable across the broad range of manufacturing/shipping/market and levels (e.g. pharmaceutical, manufacturing, recall, governmental tracking (visa/passport/driver license), quality control, event tracking, human control systems (prisoner, jail, employee control systems), medical systems (clinical trials, vaccine tracking, drug administration systems) international and national shipping systems (FedEx, USPS, UPS etc.), and manufacturer-supplier to multiple additional supplier to customer level changes).

It should be noted that while previous discussion included reviews of 1D and 2D encodation schemes and combinations in Composite Symbologies, users of the present invention may create non-recognized customized format for a particular encodation scheme, these customized formats would generally follow 1D or 2D encodation schemes but place custom designed designated identifiers in customized positions within the scheme preventing reading/scanning by unauthorized users.

Figure 30:
FIG. 30 is an exemplary code specimen as discussed herein.
Figure 31:
FIG. 31 is an exemplary code specimen as discussed herein.
Figure 32:
FIG. 32 is an exemplary code specimen as discussed herein.

One possible alternative serialization scenario of one embodiment of the present invention may optionally include the following steps:

a) Manufacturer pre-prints a label offline with a commercial printer, or in an inline setting prints any encrypted 2D Composite bar code (2D symbology encodation) like Reduced Space Symbology (RSS) Limited Composite, see FIG. 30.

b) The information contained in one embodiment would contain any 'product' or 'item' identifying data or specific item information in a globally recognized format or optionally a non-recognized customized format may be used specific to and created by a particular worldwide manufacturer and agreed to by its trading partners. (e.g., General Electric or Pfizer).

c) The Label is applied to product and shipped. Receiver would need a corresponding (1D symbology encodation) here a RSS Limited Linear bar code with the appropriate 'hook' electronically built into the code for example, see FIG. 31 to complete the entire information encoded. This bar code may be optionally placed electronically in a scanning system, on a user ID badge (See e.g., FIG. 10B), or on a designator capable of being combined and scanned with the above RSS limited composite.

d) The completed code when combined in the alternative manners described would look like FIG. 32 and would reveal the completed data (both higher order information and specific item information) when scanned or read by appropriate scanners or readers optionally accessing a secure database.

Figure 33:
FIG. 33 is an exemplary code specimen as discussed herein.

Yet another possible alternative serialization scenario of one embodiment of the present invention may optionally include the following steps:

a) Manufacturer pre-prints a label or, in an online setting or manufacturing setting, prints any encrypted 2D Composite bar code (2D Symbology encodation) like this Reduced Space Symbology (RSS) Limited Composite, which in this example, see FIG. 33.

b) The information contained in this present alternative embodiment (as shown above) would contain (for example) a 'hashed' National Drug Code (e.g. a 10 digit code including designations for manufacturing company, drug type, strength, and/or transmission means or type, and serial number etc.)

c) The label is then applied to a product, accounted for according to a manufacturer's practice and shipped. A corresponding RSS Limited Linear bar code (1D symbology encodation) (retained by the authorized and designated receiver) is physically held proximate the 2D Composite and a pre-programmed scanner or reader containing either a prefix or a suffix completes the scannable information within both labels as a string, or optionally be programmed to create a hyperlink to a prearranged and custom designed Application Software Platform on the World Wide Web for further decoding and linking with a master data base to authenticate the label and product.

Figure 34:
FIG. 34 is an exemplary code specimen as discussed herein.
Figure 35:
FIG. 35 is an exemplary code specimen as discussed herein.

A third possible alternative serialization scenario of one embodiment of the present invention may optionally include the following steps:

a) A Manufacturer pre-prints a Composite Symbology label (on-site or off-site) containing the (in this example) a National Drug Code, Lot and Expiration Date and a designated individualized product or item Serial Number (either in a sequential, numeric, or random alpha or alpha-numeric manner or optionally encrypted manner) in a bar code like but not limited to RSS Limited formats, that would be machine readable and optionally contain human readable references, see FIG. 34 or FIG. 35.

b) The product with the label is then shipped to a receiver.

c) When received an appropriately pre-programmed scanner or reader parses out the relevant data into data fields, for example like this: NDC 0006987654 Lot XYZ123 Serial Number ESE or 01234567890 and scans these fields them into relevant data fields in a master data base linking the authorized shipping label with the authenticated receiving label. Alternatively, where the label is no longer machine readable, an operator may access a secure master data base and hand-enter the human readable references to re-create the secure symbology label for later scanning and use.

It is additionally envisioned that one possible alternative embodiment made capable by modification and adaptation of selected features or aspects of the present invention applied to alternative customer needs may provide an RFID/Electronic Product Code (EPC) transition by utilizing selected futures of the above described inventions as a bridge to the future RFID/EPC type systems developing within the next decade.

As an additional alternative aspect of the present invention a management group may develop privately and provide as a service an Electronic Sequence Code (ESC™) to serialize products at an individual, case, pallet, container or other level and provide an accessible Master Data Base and Authentication system. In this alternative embodiment, an outside user would request or generate a designated number of "item" specific codes for use as labels and secure them employing one of the authentication processes discussed above. As the items are shipped, moved, sold, lost, counterfeit etc., authorized users would receive authentication pedigrees from the linked system confirming origin and transport steps. Unauthorized users would receive no confirmation and would be, in some aspects, unable to scan or process the labeled product.

As aspects of the present invention presently offer unit-specific codes, for example for verifying tracking and providing a pedigree for an individual's prescription or OTC (over the counter) drug product with specific NDC (national drug code), Lot number, Expiration Date, serial number etc. information), etc. it is envisioned that those in the pharmaceutical industry would particularly employ the present invention in one of it's many aspects.

In yet another aspect of the present invention, those skilled in the art will recognize that additional levels of scrambling and other types of secure technology may be applied to the secure data base and control systems provided with alternative embodiments of the present invention.

According to another aspect of the present invention there is optionally provided a secure application software platform, a bar code engine, or other device or systems enabled to conduct at one of the optional actions noted above, including sending to authorized users electronic files of any 1D or 2D globally recognized bar code combinations or encrypted representations of same separately or together to a suitably configured commercial printer (on-line/stand-alone).

As noted, a secure application software platform and bar code engine may be adaptively considered as or adapted to work within at least one of the optional systems and methods described herein. For example, a bar code engine or software platform may be optionally programmed conduct the steps necessary to accomplish one of the alternative embodiments of the present invention or to determine selective steps performed by one alternative embodiment of the invention. For example, a bar code engine or software platform may be designed to optionally include steps of (in one alternative embodiment of the present invention) enumeration, encoding, printing or other steps as discussed herein, or any one of the steps individually depending upon a users particular system, apparatus, or method of use where off-the shelf and/or custom designed hardware and software units may be adaptively joined in a 'system,' 'platform,' or 'engine' in a manner effective to achieve at least one of the alternative embodiments noted herein.

As noted herein the descriptive phrase enumerating or enumeration is to be broadly interpreted as deciding upon or determining or selecting an identification system or numbering or code scheme of any kind according to and optionally including any of the 1D, 2D or Composite bar code systems noted herein. This enumeration may additionally include the generation of a custom-designed identification system determined and agreed to by users of the identification system but presently not standardized by the UCC/EAN organizations. In one alternative example, a particular enumerated item specific designation is encoded into a Composite symbology encodation containing both a RSS Limited Composite bar code and a RSS Limited Linear bar code.

As also noted herein the phrase item specific designation may optionally include information of one or both of a higher-order-type information (ex. NDC, country code, manufacturer etc.) and a specific-item-type information (e.g., serial, item, product number etc.) depending upon a user's desire for security features, and may be immediately readable or initially encrypted and readable only at a first initial encrypted level requiring a later second additional decryption to finally read the specific item information.

It is also noted herein, that as used composite symbologies may include 2D symbologies that are themselves composite symbologies. For example, where a 2D symbology is a RSS Limited Composite (a first type of composite symbology) and is joined with a 1D RSS Limited Linear code, the combined "composite symbology" includes the initial RSS composite symbology already, thus the phrases 2D and 1D are used descriptively.

It is also noted herein, that those skilled in the art should recognized that the use of the phrase "NDC code" includes all other universally recognized numbering systems, and that any use of a Data Matrix herein includes the capability to utilize the Data Matrix as a data string carrier.

In the claims, means- or step-plus-function clauses are intended to cover the structures described or suggested herein as performing the recited function and not only structural equivalents but also equivalent structures. Thus, for example, although a nail, a screw, and a bolt may not be structural equivalents in that a nail relies on friction between a wooden part and a cylindrical surface, a screw's helical surface positively engages the wooden part, and a bolt's head and nut compress opposite sides of a wooden part, in the environment of fastening wooden parts, a nail, a screw, and a bolt may be readily understood by those skilled in the art as equivalent structures.

Although only a single or a selection of exemplary embodiments of this invention are described in detail above, those skilled in the art will readily appreciate that many modifications are possible in the exemplary embodiment(s) without materially departing from the novel teachings and advantages of this invention.

What is claimed is:

1. A method for enhancing information security during item transfer, comprising the steps of:
    enumerating an item specific designation for a user specified item;
    encoding said enumerated item specific designation into a readable composite symbology encodation;
    said composite symbology encodation, comprising:
        at least a first and a second encoded symbology portion, wherein said at least first and second portions are electronically joined during said step of encoding and require a combination of said portions to read said encoded item specific designation;
    deconstructing said readable composite symbology encodation into said at least first and second encoded symbology portions rendering at least one of said at least first and second portions separately unreadable without the other;
    applying one of said deconstructed at least first and second encoded symbology portions to said user specified item;
    transferring said user specified item to at least a first authorized party;
    transferring said other of said at least first and second encoded symbology portions to said at least first authorized party separately from said user specified item; and
    reconstructing said at least first and second encoded symbology portions and into said readable composite symbology encodation, thereby enabling said authorized party to conduct a step of reading said composite symbology encodation and determining said item specific designation.

2. A method of enhancing information security during item transfer, according to claim 1, further comprising the steps of:
    recording at least said item-specific designation for said user specified item in an authorized-use accessible storage system;
    providing to said at least first authorized party means for securely accessing said authorized-use storage system; and
    accessing said authorized-use accessible storage system and comparing said reconstructed composite symbology encodation with said recorded item-specific designation, thereby enabling said at least first authorized party to confirm at least one of a pedigree and an authentication of said user specified item.

3. A method for enhancing information security during item transfer, according to claim 2, wherein:
    said means for securely accessing includes means for securely updating said authorized-use storage system, whereby said system enables at least a receipt confirmation of said user specified item.

4. A method of enhancing information security during item transfer, according to claim 2, further comprising the steps of:
    conducting at least one of a step of updating, a step of modifying, and a step of correcting said authorized-use accessible storage system to link said recorded item specific designation to at least one of a location status, a return status, an authorization status, a pedigree status, and a counterfeit status, relative to said user specified item, whereby said method enables a comprehensive supply-chain report during said item transfer to said authorized party.

5. A method of enhancing information security during item transfer, according to claim 2, further comprising the steps of:
    accessing said authorized-use accessible storage system and determining at least a location of said user specified item.

6. A method of enhancing information security during item transfer, according to claim 2, further comprising the steps of:
    enabling said authorized party to access said authorized-use accessible storage system via one of an internet-based secure hyperlink connection and an intranet-based connection, wherein said step of enabling allows an easy access to said accessible storage system for simplified and secure item tracking.

7. A method of enhancing information security during item transfer, according to claim 2, wherein:

said step of encoding said readable composite symbology encodation further comprises a step of:
    providing additional human readable references to said item specific designation on respective said at least first and second encoded symbology portions.

8. A method of enhancing information security during item transfer, according to claim 7, wherein:
    during said step of deconstructing portions of said human readable references are also deconstructed relative to said respective encoded symbology portions, thereby allowing during said step of reconstructing said authorized party to enter said human readable references in said authorized-use accessible storage system to reconstruct said item specific designation and enable said at least first authorized party to confirm said item specific designation despite a damage to said encoded symbology portions rendering them incapable of reading by non-human devices during said steps of reconstructing and accessing.

9. A method of enhancing information security during item transfer, according to claim 1, wherein:
    at least one of said first and second encoded symbology portions is a 2D symbology encodation; and
    said other of said first and second encoded symbology portions is a 1D symbology encodation, whereby said readable composite symbology encodation combines said 1D and said 2D symbology encodations enabling at least an increased security during item transfer.

10. A method of enhancing information security during item transfer, according to claim 1, wherein:
    at least one of said first and second encoded symbology portions is a 2D symbology encodation; and
    said other of said first and second encoded symbology portions is a 2D symbology encodation, whereby said readable composite symbology encodation combines said 2D and said 2D symbology encodations enabling at least an increased security during item transfer.

11. A method of enhancing information security during item transfer, according to claim 1, wherein:
    said step of reconstructing includes at least one of a step of physically reconstructing and at step of electronically reconstructing said first and second symbology encoded portions into said readable composite symbology encodation, whereby said method enables an adaptive reconstructing method improving information security during item transfer.

12. A method of enhancing information security during item transfer, according to claim 1, wherein:
    said item specific designation includes both higher-order information and specific-item information effective to provide a user-determined unit designation to said user specified item.

13. A method of enhancing information security during item transfer, according to claim 12, wherein:
    said higher-order information includes at least one of a UPC identifier, a NDC code identifier, a manufacturer identification identifier, and a transmission means identifier; and
    said specific-item information includes at least a one of a serial number and a custom identification number for said user specified item.

14. A method for enhancing information security during item transfer, comprising the steps of:
    enumerating an item specific designation for a user specified item;
    encoding said enumerated item specific designation into a composite symbology encodation;
    said composite symbology encodation, comprising:
        at least a first 2D encoded symbology portion and a second 1D encoded symbology portion, wherein said at least first and second portions are electronically joined or linked during said step of encoding and require a combination of said portions to electronically read said composite symbology encodation of said item specific designation;
    deconstructing said readable composite symbology encodation into said at least first and second encoded symbology portions rendering at least one of said at least first and second portions separately unreadable;
    applying one of said deconstructed at least first and second encoded symbology portions to said user specified item;
    transferring said user specified item to at least a first authorized party;
    transferring said other of said at least first and second encoded symbology portions to said at least first authorized party separately from said user specified item; and
    reconstructing said at least first and second encoded symbology portions and into said readable composite symbology encodation, thereby enabling said authorized party to conduct a step of reading said composite symbology encodation and determining said item specific designation.

15. A method for enhancing information security during item transfer, according to claim 14, wherein:
    said first 2D encoded symbology portion is an RSS Composite-type symbology; and
    said second 1D encoded symbology portion is one of an RSS Linear-type symbology and an UCC/EAN-type.

16. An apparatus, for enhancing information security during an item transfer, comprising:
    means for enumerating an item specific designation for a user specified item;
    means for encoding said enumerated item specific designation into a readable composite symbology encodation;
    said composite symbology encodation, comprising:
        at least a first and a second encoded symbology portion, wherein said at least first and second portions are electronically joined by said means for encoding thereby requiring at least one of a physical and an electronic combination of said portions to read said encoded item specific designation;
    means for deconstructing said readable composite symbology encodation into said at least first and second encoded symbology portions rendering at least one of said at least first and second portions separately unreadable;
    means for applying one of said deconstructed at least first and second encoded symbology portions to said user specified item;
    means for transferring said user specified item to at least a first authorized party;
    means for transferring said other of said at least first and second encoded symbology portions to said at least first authorized party separately from said user specified item; and
    means for reconstructing said at least first and second encoded symbology portions and into said readable composite symbology encodation, thereby enabling said authorized party to read said composite symbology encodation and determining said item specific designation.

17. An apparatus, for enabling an improved security and information transfer between a label generator generating a label for an item and an authorized party receiving the item, comprising:

means for enumerating an item specific designation for said item;

means for generating at least a machine readable composite symbology encodation for said item specific designation and for deconstructing said composite symbology encodation into at least a first encoded portion and a second encoded portion rendering said first and second encoded portions separately unreadable;

said first encoded portion being a 2D symbology encodation portion;

said second encoded portion being a 1D symbology encodation portion;

means for printing at least said first encoded portion on a label for said item and applying said label to said item;

means for separately transferring said item labeled with said first encoded portion and said second encoded portion to said authorized party; and means for reconstructing said first encoded portion from said label and said separately transferred second encoded portion thereby enabling a reading of said composite symbology and determination by said authorized party of said item specific designation.

18. An apparatus, according to claim 17, wherein:

said means for reconstructing enables at least one of a physical reconstruction and an electronic reconstruction of said composite symbology encodation, whereby said apparatus enables ready adaptation of said apparatus to differing authorized party practices and damage to said label.

19. An apparatus, according to claim 18, further comprising:

means for providing a secure master data system to said label generator and said authorized party;

means for recording said machine readable composite symbology encodation representing said item specific designation in said master data system linked with said designated specific-item information identifier; and means for enabling said authorized party to securely access said secure master data system upon at least said reconstruction of said of said first and second encoded portions, thereby enabling an authentication by said authorized party that said item labeled with said first encoded portion is said item initially labeled by said label generator.

20. An apparatus, according to claim 19, further comprising:

means for generating human readable references respective to said first and second encoded portions and for printing said human readable references respective to said first encoded portion on said label for said item, whereby said item label and said means for reconstructing enables a specific individualized product or item identification with a safety feature enabling a human access to said specific-item information identifier.

21. An apparatus, according to claim 17, wherein:

said item specific designation includes at least specific-item information including a designated item serial number;

said designated item serial number being at least one of a sequential number, a numeric number, an alpha-character number, and an alpha-numeric number; and said designated item serial number being at least one of an encrypted and non-encrypted number.

22. An apparatus, according to claim 21, wherein:

said composite symbology encodation further comprises at least higher-order information; and said higher-order information includes at least one of a National Drug Code (NDC) identifier, a Lot identifier, an Expiration Date identifier, a general item identifier, and an item-manufacturer identifier, whereby said apparatus enables a secure master data system storage and secure assess to both said higher-order information and said specific-item information providing an improved security and an enhanced information storage capability to an item transfer between said label generator and said authorized party.

23. A method for providing an improved information security during an item transfer between an initial item identifier and at least one supply chain party in a supply chain, comprising the steps of:

selecting an item requiring an item specific designation;

selecting an identification system for enumerating an identifier for said item from one of an industry-acceptable identification system and a custom-created identification system;

enumerating an item specific designation for said item;

said item specific designation including at least higher-order information and specific-item information;

said specific-item information including at least a unique serial number for said item;

encoding at least said specific item information in at least a first 2D bar code;

applying said at least first 2D bar code to one of said item and an item label using one of a commercially acceptable off-line and a commercially acceptable online printing method producing a 2D bar code unreadable separately from a security 1D bar code;

generating said linked security 1D bar code for said supply chain party enabling a reading of a combination of said 2D and 1D bar codes only when said 2D and 1D bar codes are physically or electronically joined;

said 2D bar code and said 1D bar code being one of electronically linked/hooked codes and electronically unlinked/unhooked codes;

maintaining a secure database system joining at least each said item, said unique serial number for each item; and said 2D bar code in a secure database accessible via the Internet;

maintaining a secure connection between said secure data base system, the Internet, and said at least one supply chain party enabling access through at least one of an authorized use of said physically or electronically joined 1D and 2D bar codes and an authenticated use employing human enterable data;

transferring said security 1D bar code to said supply chain party in a secure manner separately from said 2D bar code and said item; and allowing for a secure updating of a location of said item in said secure data base system along said supply chain, whereby said method enables a certification of a pedigree of said item via said secure data base system and limits an access to said secure data base system when said 1D and 2D bar codes are not joined.

24. An system for providing an improved information security during an item transfer between an initial item identifier and at least one supply chain party in a supply chain, comprising:

means for selecting an item requiring an item specific designation;

means for selecting an identification system for enumerating an identifier for said item from one of an industry-acceptable identification system and a custom-created identification system;

means for enumerating a item specific designation for said item;

said item specific designation including at least higher-order information and specific-item information;

said specific-item information including at least a unique serial number for said item;

means for encoding at least said specific item information in at least a first 2D bar code;

means for applying said at least first 2D bar code to one of said item and an item label using a commercially acceptable off-line or on-line printing method producing a scannable 2D bar code when joined with a linked security 1D bar code;

means for generating said linked security 1D bar code for said supply chain party enabling a reading of a combination of said 2D and 1D bar codes only when said 2D and 1D bar codes are physically or electronically joined;

said 2D bar code and said 1D bar code being one of electronically linked/hooked codes and electronically unlinked/unhooked codes;

means for maintaining a secure database system storing at least each item, said unique serial number for each item; and said 2D bar code in a secure database;

means for establishing and maintaining a secure connection between said secure data base system, and said at least one supply chain party enabling access through at least one of an authorized use of said physically or electronically joined 1D and 2D bar codes and an authenticated use employing secure human enterable data;

means for transferring said security 1D bar code to said supply chain party in a secure manner separately from said 2D bar code and said item; and means for allowing for a secure updating of a location of said item in-said secure data base system along said supply chain, whereby said method enables a certification of at least one of an authentication and a pedigree of said item via said secure data base system and limits an access to said secure data base system when said 1D and 2D bar codes are not joined.

25. A method for providing improved security during an item transfer between an initial item identifier and at least one supply chain party in a supply chain, comprising:

selecting an item requiring an item specific designation;

selecting an identification system for enumerating an identifier for said item from one of an industry-acceptable identification system and a custom-created identification system;

enumerating a item specific designation for said item;

said item specific designation including at least higher-order information and specific-item information;

said specific-item information including at least a unique serial number for said item;

encoding at least said specific item information in at least a first 2D composite bar code;

applying said at least first 2D composite bar code to one of said item and an item label using one of a commercially acceptable off-line and a commercially acceptable online printing methods; producing a readable 2D composite bar code when joined with a second security bar code;

requiring said at least one supply chain party to separately secure said second security bar code enabling a reading of said first 2D composite bar code only when said first 2D composite code and said second security bar code are physically or electronically joined;

said first 2D composite bar code and said second security code being one of electronically linked/hooked codes and electronically unlinked/unhooked codes;

maintaining a secure database system joining at least each item, said unique serial number, said first 2D composite bar code, and said second security code in a secure data base accessible via the Internet;

enabling a secure connection between said secure data base system, the Internet, and said at least one supply chain party enabling an access to said secure data base system through at least one of an hand entry and an electronic entry of a joined 2D composite code and said second security bar code;

requiring an authentication of said supply chain party by a scanning of at least a first form of scannable identification prior to an accessing of said secure data base system; and allowing for a secure updating of a location of said item in said secure data base system along said supply chain, whereby said method enables a certification of a pedigree of said item via said secure data base system, allows a reporting of the same, and limits an access to said secure data base system when said first 2D composite bar code and said second security bar code are not joined.

26. A system for enabling an improved security and information transfer between a label generator generating a label for an item and an authorized party receiving the item, comprising:

means for enumerating an item specific designation for said item;

means for generating at least a machine readable composite symbology encodation for said item specific designation and for printing said composite symbology encodation on said label;

said composite symbology encodation including at least a first encoded portion and a second encoded portion;

said first encoded portion being a 2D symbology encodation portion;

said second encoded portion being a 1D symbology encodation portion;

said means for generating including means for printing a human readable encodation reference proximate respective said first and second portions of said composite symbology encodation duplicating said item specific designation, a secure master data system including said machine readable composite symbology encodation linked with said item specific designation for said item;

means in said secure master data system for providing a secure access to said secure master data system by said label generator and said authorized party; and said secure master data system including means for machine entering of said machine readable composite symbology and means for human entering of said human readable references, whereby said item label enables a tracking of an item specific designation and thereby enables an improved safety feature enabling at least one of a secure human access and a secure machine access to said item specific designation to confirm an authenticity of said item.

27. A system, according to 26, wherein:

said item specific designation includes a item serial number;

said designated item serial number being at least one of a sequential number, a numeric number, an alpha-character number, and an alpha-numeric number;

said designated item serial number being at least one of an encrypted and non-encrypted number;

said machine readable composite symbology further comprising higher-order information; and said higher-order information including at least one of a National Drug Code (NDC) identifier, a Lot identifier, an Expiration Date identifier, a general item identifier, and an item-manufacturer identifier, whereby said system enables a secure data system storage and secure assess to both said higher-order information and item specific designation providing an improved security and an enhanced information storage capability to an item transfer between said label generator and said authorized party.

28. A management platform for managing a method for enhancing information security during item transfer, comprising:

means for securely receiving a first encodation portion of a composite symbology encodation from an authorizing supply chain partner;

said completed composite symbology encodation representing an item specific designation for a user specified item;

said composite symbology encodation including a 1D encodation portion and a 2D encodation portion;

means for separately receiving said second encodation portion of said composite symbology encodation separately from said means for securely receiving;

said first and second encodation portions being separately unreadable and requiring one of a physical and an electronic joining to form said completed composite symbology encodation prior to one of a physical and a machine reading of said composite symbology encodation;

means for one of a physically and a electronically joining said first encodation portion and said second encodation portion and forming said completed composite symbology encodation; and means for scanning said completed composite symbology encodation and for determining said item specific designation, whereby said means for separately receiving and said means for physically and electronically joining providing an enhanced security feature minimizing a risk and determining an authentication of said user specified item.

* * * * *